United States Patent
Broggi

(10) Patent No.: US 12,027,113 B1
(45) Date of Patent: Jul. 2, 2024

(54) 3D DISPLAY USING STACKED LAYERS

(71) Applicant: Ambarella International LP, Santa Clara, CA (US)

(72) Inventor: Alberto Broggi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 18/119,597

(22) Filed: Mar. 9, 2023

(51) Int. Cl.
  *G09G 3/00* (2006.01)
  *G06T 5/70* (2024.01)
  (Continued)

(52) U.S. Cl.
  CPC ............ *G09G 3/3208* (2013.01); *G06T 5/70* (2024.01); *G09G 5/377* (2013.01);
  (Continued)

(58) Field of Classification Search
  CPC . G02F 1/13; G02F 1/133; G02F 1/137; G02F 1/29; G02F 1/163; G02F 1/167; G02F 1/1334; G02F 1/13357; G02F 1/1343; G02F 1/1335; G02F 1/1347; G02F 1/1677; G09G 3/00; G09G 3/14; G09G 3/20; G09G 3/32; G09G 3/34; G09G 3/36; G09G 3/3208; G09G 3/3225; G09G 5/00; G09G 5/02; G09G 5/10; G09G 5/38; G09G 5/377; G09G 2300/023; G09G 2340/12; B60Q 1/00; A63F 13/00; A63F 13/08; H04N 13/31; H04N 13/302; H04N 13/305; H04N 13/324; H04N 13/356; H04N 13/393; H04N 7/18; H04N 9/64; H04N 13/00; H04N 13/04; H04N 13/128; H04N 17/02; G06T 1/00; G06T 3/00; G06T 3/40; G06T 5/00; G06T 5/002; G06T 7/90; G06T 13/60; G06T 15/00; G06T 15/16; G06T 15/40; G06T 19/00; G06F 3/00; G06F 3/01; G06F 3/03; G06F 3/14; G06F 3/044; G06F 3/0484; G02B 27/222; G02B 27/26
  See application file for complete search history.

(56) References Cited

U.S. PATENT DOCUMENTS 5,745,197 A * 4/1998 Leung ................. G02F 1/13471
  348/E13.058
6,661,425 B1 * 12/2003 Hiroaki .................. G09G 3/003
  345/626
(Continued)

*Primary Examiner* — Chanh D Nguyen
*Assistant Examiner* — Nguyen H Truong
(74) *Attorney, Agent, or Firm* — Maiorana Patent Law, PA

(57) ABSTRACT

The invention concerns an apparatus comprising a plurality of display panels and a processor. The plurality of display panels may be arranged as individual display layers in a stacked formation, each configured to display video output. The processor may be configured to determine a three dimensional effect of a graphical entity and present data for the video output to each of the display panels in response to the three dimensional effect. Each of the display panels may be transparent at locations without the video output. Determining the three dimensional effect may comprise determining a portion of the three dimensional effect for the video output to display on each of the individual display layers. The video output combined on the stacked formation may comprise a real three dimensional representation of the graphical entity.

19 Claims, 12 Drawing Sheets

(51) Int. Cl.
  *G06T 15/00*   (2011.01)
  *G09G 3/3208*  (2016.01)
  *G09G 5/377*   (2006.01)
  *H04N 13/302*  (2018.01)
  *H04N 13/395*  (2018.01)

(52) U.S. Cl.
  CPC ..... *H04N 13/302* (2018.05); *G09G 2300/023* (2013.01); *G09G 2340/12* (2013.01)

(56) References Cited

U.S. PATENT DOCUMENTS

| | | | |
|---|---|---|---|
| 9,619,919 B1* | 4/2017 | Postnikov | G09G 5/14 |
| 2011/0175902 A1* | 7/2011 | Mahowald | H04N 13/395 |
| | | | 345/419 |
| 2014/0164921 A1* | 6/2014 | Salinas | G06F 16/29 |
| | | | 715/716 |
| 2016/0260258 A1* | 9/2016 | Lo | G02B 27/0172 |
| 2017/0301145 A1* | 10/2017 | Miller | G09G 5/14 |
| 2017/0310956 A1* | 10/2017 | Perdices-Gonzalez | |
| | | | G09G 3/2092 |
| 2017/0330368 A1* | 11/2017 | Bell | G06T 11/60 |
| 2018/0322818 A1* | 11/2018 | O'Brien | G06T 15/005 |
| 2023/0245373 A1* | 8/2023 | Xiong | G06T 15/205 |
| | | | 345/419 |

* cited by examiner

3D DISPLAY USING STACKED LAYERS

FIELD OF THE INVENTION

The invention relates to video displays generally and, more particularly, to a method and/or apparatus for implementing a 3D display using stacked layers.

BACKGROUND

The entertainment industry has been attempting to popularize 3D video for a long time. Early 3D content relied on viewers having to wear multi-colored polarized glasses. Current 3D displays rely on displaying two images captured from slightly different perspectives. The two images are interlaced on the display to create images or frames that appear blurry. Viewers again have to wear glasses to separate the two interlaced images. The separated images are presented to each eye to create the impression of depth.

Conventional 3D video content creates the impression of depth and requires additional hardware (i.e., glasses) for the viewer to see the 3D effect. Wearing 3D glasses is impractical for uses outside of entertainment.

It would be desirable to implement a 3D display using stacked layers.

SUMMARY

The invention concerns an apparatus comprising a plurality of display panels and a processor. The plurality of display panels may be arranged as individual display layers in a stacked formation, each configured to display video output. The processor may be configured to determine a three dimensional effect of a graphical entity and present data for the video output to each of the display panels in response to the three dimensional effect. Each of the display panels may be transparent at locations without the video output. Determining the three dimensional effect may comprise determining a portion of the three dimensional effect for the video output to display on each of the individual display layers. The video output combined on the stacked formation may comprise a real three dimensional representation of the graphical entity.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
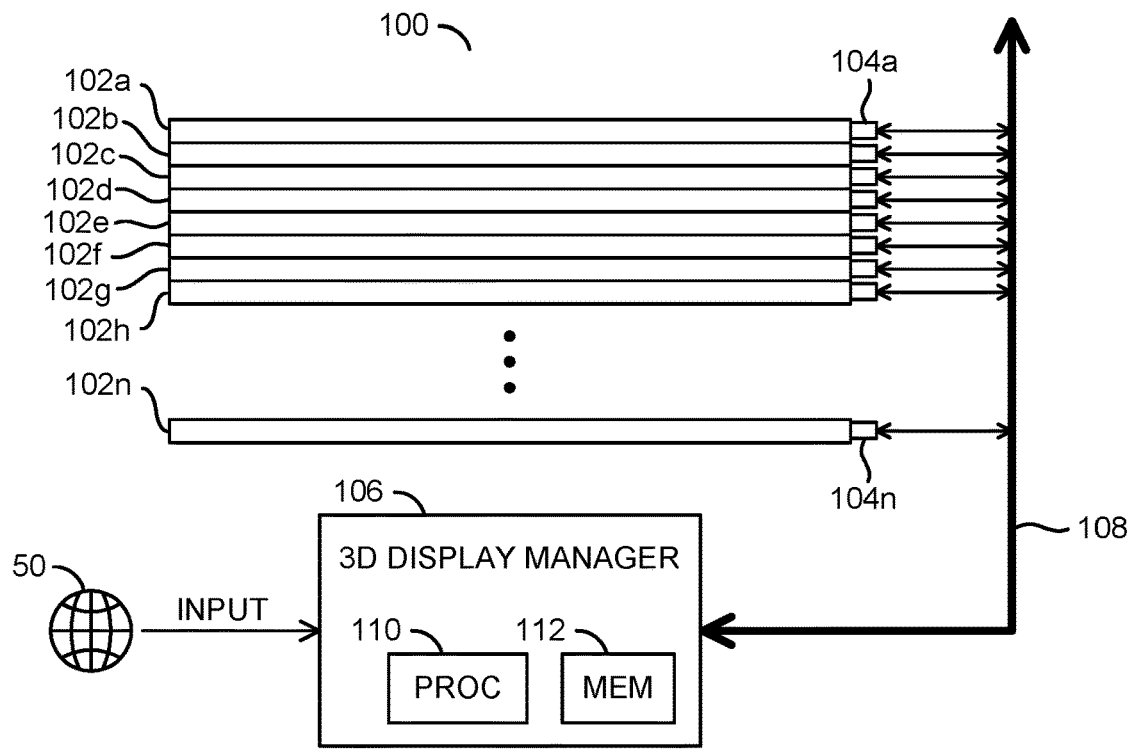
FIG. 1 is a block diagram illustrating an example embodiment of the present invention.

Embodiments of the present invention include providing a 3D display using stacked layers that may (i) provide a real 3D display instead of creating an impression of depth for 3D, (ii) implement multiple transparent display layers, (iii) render graphical entities on various display layers, (iv) provide a display manager to determine which graphical entities are displayed on each display layer, (v) implement a bus for presenting graphical entities on each layer, (vi) encode pixel data based on range data, (vii) select a display layer for portions of the graphical entities based on range data, (viii) be implemented in a vehicle, (ix) overlay warnings on top of background content, (x) render closer objects on top of objects that are farther away and/or (xi) be implemented as one or more integrated circuits.

Embodiments of the present invention may be configured to create a real three dimensional (3D) display. The real 3D display may be implemented using multiple transparent displays. In an example, the transparent displays may be implemented using transparent organic light-emitting diode (OLED) displays.

The real 3D dimensional display may comprise a number of transparent displays implemented one on top of (or in front of) the other. Implementing the transparent displays one on top of the other may create a stacked formation of displays. The stacked formation of displays may enable different images (or portions of images) to be displayed on different display panel layers in the stacked formation of displays. In one example, a stacked formation of approximately five or six transparent displays may be used to create a real 3D effect.

In some embodiments, a display manager may be implemented for the stacked formation of display panels. The display manager may be configured to determine which information to render on each display layer. In an example, information determined to be more important may be rendered on a topmost (or foreground) layer (e.g., on top of or in front of other background information). In another example, information may be displayed on each layer based on a spatial relationship (e.g., objects closer to a point of view may be rendered on the topmost layer, and objects farthest away from the point of view may be rendered on the bottom layer).

As the panels (or glass) of each video display in the stacked formation becomes thinner (e.g., as technology improves), a more detailed 3D representation may be generated while occupying the same amount of physical space. For example, stacking more display layers increases a 3D resolution (e.g., increase a resolution on a Z axis of the display). Additional layers may enable more detailed 3D representations, but may occupy additional physical space. Generally, the thinner and the more transparent the layers, the more display layers may be implemented in the stacked formation, which may provide more layers for representing the 3D graphical entity. In some embodiments, as the 3D resolution increases, the real 3D display may be capable of displaying detailed wireframe views of objects. In some embodiments, a stacked 3D display in a vehicle may be capable of providing an all-around-view (a stitched video comprising multiple video frames captured from all around a vehicle showing a top-down view of the vehicle) in 3D. The type of content displayed on the stacked real 3D display may depend on the number of display layers available.

The real 3D display may be configured to display graphical entities. The graphical entities may comprise 3D representations of real objects (e.g., recorded video of people, vehicles, animals, landscapes, etc.). The graphical entities may comprise synthetic symbols (e.g., renderings of letters, numbers, gauges, icons, etc.). The graphical entities may be converted into a three dimensional effect. In an example, the three dimensional effect may comprise determining which display layer to render (or draw) each portion of the graphical entity on. A portion of the three dimensional effect for the video output may be displayed on each of the individual display layers. The types of graphical entities rendered and/or the method for determining the three dimensional effect for the graphical entities may be varied according to the design criteria of a particular implementation.

In some embodiments, a 3D display manager may be implemented for determining the three dimensional effect. The 3D display manager may be configured to determine an intersection of the 3D graphical entity with a set of planes. The planes may conceptually represent the display layers. The intersection may determine the 2D shape for a portion of the graphical entity to display on each display layer.

In some embodiments, range data and/or disparity information may be determined for an image and/or graphical entity. A range of distances may be encoded onto each of the various display layers. For example, closer distances may be collapsed onto a top/front layer, and farthest distances may be collapsed onto a bottom/back layer. The range data may be acquired from various sources (e.g., disparity data from stereo cameras, disparity data determined using a monocular camera and computer vision, radar data, LIDAR data, etc.).

In some embodiments, content may be selected for each display layer based on priority, importance and/or prominence. In an example, general information may be displayed on a background layer (e.g., a bottom/back layer). In another example, high priority information such as a warning may be displayed an a top layer. In some embodiments, objects drawn on a top layer may have additional visual effects applied. The visual effects may be applied by adjusting content on lower layers. For example, a shadow effect may be applied by drawing a grayscale version of a graphical entity on layers below underneath a full color version of the graphical entity on the top layers.

The real 3D display of the graphical entities generated using the stacked formation may enable the real 3D display to be used in various applications. For example, since the viewer does not have to wear glasses to see the real 3D effect, the stacked display may not be limited to scenarios where the viewer is stationary and/or entertainment media. In an example, the real 3D display may be implemented to display the all-round-view system in a vehicle. In yet another example, the real 3D display may be implemented to display departure flights in airports (e.g., where all flights may be printed in a back layer, and the boarding flights may be printed in a foreground layer to make the boarding flights appear more visible and/or prominent). In yet another example, the real 3D display may be implemented to display any type of graphical user interface (GUI), that comprises a virtual button on a screen (e.g., the button may be printed on a back/bottom layer when the button is in a 'pressed' state and in a foreground/top layer when the button is a 'not pressed' state). GUIs that implement the real 3D display may comprise ATMs, wearables, coffee machines, etc. The types of scenarios that implement the real 3D display may be varied according to the design criteria of a particular implementation.

Referring to FIG. 1, a block diagram illustrating an example embodiment of the present invention is shown. An apparatus (or circuit or system) 100 is shown. The apparatus 100 may implement a 3D display using stacked display panel layers. The apparatus 100 may be configured to generate real 3D content. For example, the real 3D content may be displayed on the apparatus 100 at various distances (e.g., depth layers) to enable a viewer to see a three dimensional effect that relies on actual depth (e.g., instead of relying on an impression of depth when viewed using 3D glasses).

The apparatus 100 may comprise a number of blocks (or circuits) 102a-102n, a number of blocks (or circuits) 104a-104n and/or a block (or circuit) 106. The circuits 102a-102n may each comprise a display panel layer. The circuits 104a-104n may each comprise a display interface. The circuit 106 may comprise a display manager. The circuits 102a-102n, the circuits 104a-104n and/or the circuit 106 may be configured to communicate via a bus 108. The apparatus 100 may comprise other components (not shown). The number, type and/or arrangement of the components of the apparatus 100 may be varied according to the design criteria of a particular implementation.

The display layers 102a-102n may comprise a number of individual display panels. Each of the display panels that implement one of the display layers 102a-102n may comprise a transparent display panel. For example, each of the display layers 102a-102n may be transparent (or translucent) at locations where graphical entities are not being rendered. Similarly, each of the display layers 102a-102n may be opaque (or have a degree of opaqueness) at locations where graphical entities are being rendered. In one example, each of the display layers 102a-102n may comprise a transparent organic light-emitting diode (OLED) display.

In the example shown, the display layers 102a-102n may be in a stacked formation with the display layer 102a as a top display layer, the display layer 102n as the bottom display layer and the display layers 102b-102m as middle layers. In some embodiments, the display layer 102a may be a front layer and the display layer 102n may be a bottom layer. For simplicity, the display layer 102a may be referred to as a 'top' layer and the middle display layers 102b-102m that may be closer to the display layer 102a may be 'foreground' layers, while the display layer 102n may be referred to as a 'bottom' layer and the middle display layers 102b-102m that may be closer to the display layer 102n may be 'background' layers. However, which of the display layers 102a-102n is a top layer, a bottom layer, a front layer, a back layer, a foreground layer and/or a background layer may depend on orientation of the stacked formation of the display layers 102a-102n, the perspective of a viewer and/or the number of display layers 102a-102n implemented. In an example, if five display layers 102a-102e are implemented, then the display layer 102d may be a background layer, however if twenty display layers are implemented, then the display layer 102d may be a foreground layer. The number and/or orientation of the display layers 102a-102n may be varied according to the design criteria of a particular implementation.

The display interfaces 104a-104n may be configured to communicate data to/from the display layers 102a-102n. Generally, one of the display interfaces 104a-104n may be implemented for each one of the display layers 102a-102n. The display interfaces 104a-104n may be configured to communicate video output data to the display layers 102a-102n. The display interfaces 104a-104n may be configured to communicate information (e.g., Extended Display Identification Data (EDID), display parameters/capabilities, presence information, etc.) to the display manager 106.

The display interfaces 104a-104n may comprise a physical connector and/or other circuitry. In an example, the circuitry implemented by the display interfaces 104a-104n may be configured to store information about the display panels 102a-102n. The physical connectors implemented by the display interfaces 104a-104n may comprise standardized ports (or connectors). In an example, the display interfaces 104a-104n may be compatible with an HDMI standard. In another example, the display interfaces 104a-104n may be compatible with a DisplayPort standard. In yet another example, the display interfaces 104a-104n may be compatible with a DVI standard. In still another example, the display interfaces 104a-104n may be a custom (e.g., non-standard) connector. The type of data communicated to/from the display interfaces 104a-104n and/or the type of physical connection implemented may be varied according to the design criteria of a particular implementation.

The display manager 106 may be configured to implement a 3D display manager. The display manager 106 may be configured to communicate with each of the display layers 102a-102n (e.g., via the display interfaces 104a-104n). The display manager 106 may be configured to determine which video content to output to which of the display layers 102a-102n. The display manager 106 may be configured to determine the presence and/or display capabilities of each of the display layers 102a-102n. For example, determining a presence of the display layers 102a-102n may comprise determining a number of the display layers 102a-102n available as a depth resolution. The display manager 106 may be configured to determine a three dimensional effect for various graphical entities that may be rendered on the display layers 102a-102n. For example, the display manager 106 may be configured to convert a three dimensional graphical entity (e.g., an object, a synthetic symbol, a rendering, etc.) into portions that may be presented to the various display layers 102a-102n in order to represent the three dimensional effect.

A graphical entity 50 is shown. In the example shown, the graphical entity 50 may be presented to the display manager 106. In another example, the graphical entity 50 may be generated by the display manager 106. The graphical entity 50 may comprise an object, a synthetic symbol, a rendering, etc. In the example shown, the graphical entity 50 may be a wireframe design of an object.

A signal (e.g., INPUT) may be received by the display manager 106. The signal INPUT may comprise the graphical entity 50. In some embodiments, the graphical entity 50 may be provided from an external source. For example, a 3D software program may provide a 3D model as the graphical entity 50 and the signal INPUT may comprise data corresponding to the 3D model. In another example, a computer-aided design program may be used to provide data that corresponds to wireframe version of an object to the display manager 106 via the signal INPUT. In yet another example, the signal INPUT may comprise data from a vehicle (e.g., sensor data and/or warnings provided via a CAN bus). In still another example, the signal INPUT may comprise video frames and/or pixel data generated by a camera. In some embodiments, the processor 110 may generate the graphical entity 50. The type of data for the graphical entity 50 and/or the source of the data for the graphical entity 50 may be varied according to the design criteria of a particular implementation.

The bus 108 may be configured to enable communication between the display layers 102a-102n (e.g., via the display interfaces 104a-104n) and the display manager 106. In the example shown, the bus 108 may implement a shared bus. The shared bus 108 may enable one or more of the display layers 102a-102n to be added and/or removed from the stacked formation. In an example, the stacked formation may comprise five of the display layers 102a-102e, and a sixth display layer 102f may be connected to the shared bus 108 and the display manager 106 may be configured to operate the real 3D display 100 with additional depth resolution. In another example, the stacked formation may comprise five of the display layers 102a-102e, and the fifth display layer 102e may be disconnected from the shared bus 108, and the display manager 106 may continue to operate the real 3D display 100 with a reduced depth resolution. The display manager 106 may be configured to react seamlessly to an increase and/or decrease in a number of the display layers 102a-102n in the stacked formation (e.g., each of the display layers 102a-102n may be hot swappable and/or hot pluggable). The display manager 106 may re-configure the three dimensional effect and/or which portion of the graphical entity 50 may be displayed on each of the display layers 102a-102n in response to changes to the number of the display layers 102a-102n in the stacked formation.

The display manager 106 may comprise a block (or circuit) 110 and/or a block (or circuit) 112. The block 110 may implement a processor. The block 112 may implement a memory. The display manager 106 may comprise other components (not shown). In an example, the display manager 106 may implement I/O ports, graphics processors, computer vision modules, etc. The number, type and/or arrangement of the components of the display manager 106 may be varied according to the design criteria of a particular implementation.

The processor 110 may be configured to execute computer readable code and/or process information. In various embodiments, the computer readable code may be stored within the processor 110 (e.g., microcode, firmware, etc.) and/or in the memory 112. In some embodiments, the processor 110 may implement a general purpose processor configured to execute computer readable instructions. In some embodiments, the processor 110 may implement an application specific device.

The memory 112 may store data. The memory 1152 may implement various types of memory including, but not limited to, a cache, flash memory, memory card, random access memory (RAM), dynamic RAM (DRAM) memory, etc. The type and/or size of the memory 112 may be varied according to the design criteria of a particular implementation. The data stored in the memory 112 may correspond to display protocols, instructions for detecting the presence of the display panels 102a-102n, EDID metadata, user inputs, computer vision models, feature sets, disparity information, range encodings, graphical entity intersection points, etc.

The apparatus 100 may comprise the display panels 102a-102n arranged as individual display layers in a stacked formation. Each of the display layers 102a-102n may be configured to display video output presented by the display manager 106. The processor 110 may be configured to execute the computer readable instructions stored by the memory 112. In one example, the computer readable instructions may comprise steps for determining a three dimensional effect of the graphical entity 50. In another example, the computer readable instructions may comprise steps for presenting data for the video output to each of the display panels 102a-102n. The data for the video output may be generated in response to the three dimensional effect determined. Determining the three dimensional effect may comprise determining which portion of the three dimensional effect of the graphical entity 50 for the video output to display on which of the individual display layers 102a-102n. The display panels 102a-102n may be transparent at locations without the video output to enable a viewer to see through the top layers to the bottom layers. The video output combined on the stacked formation may comprise a real three dimensional representation of the graphical entity 50 (e.g., displayed with actual, physical depth).

Figure 2:
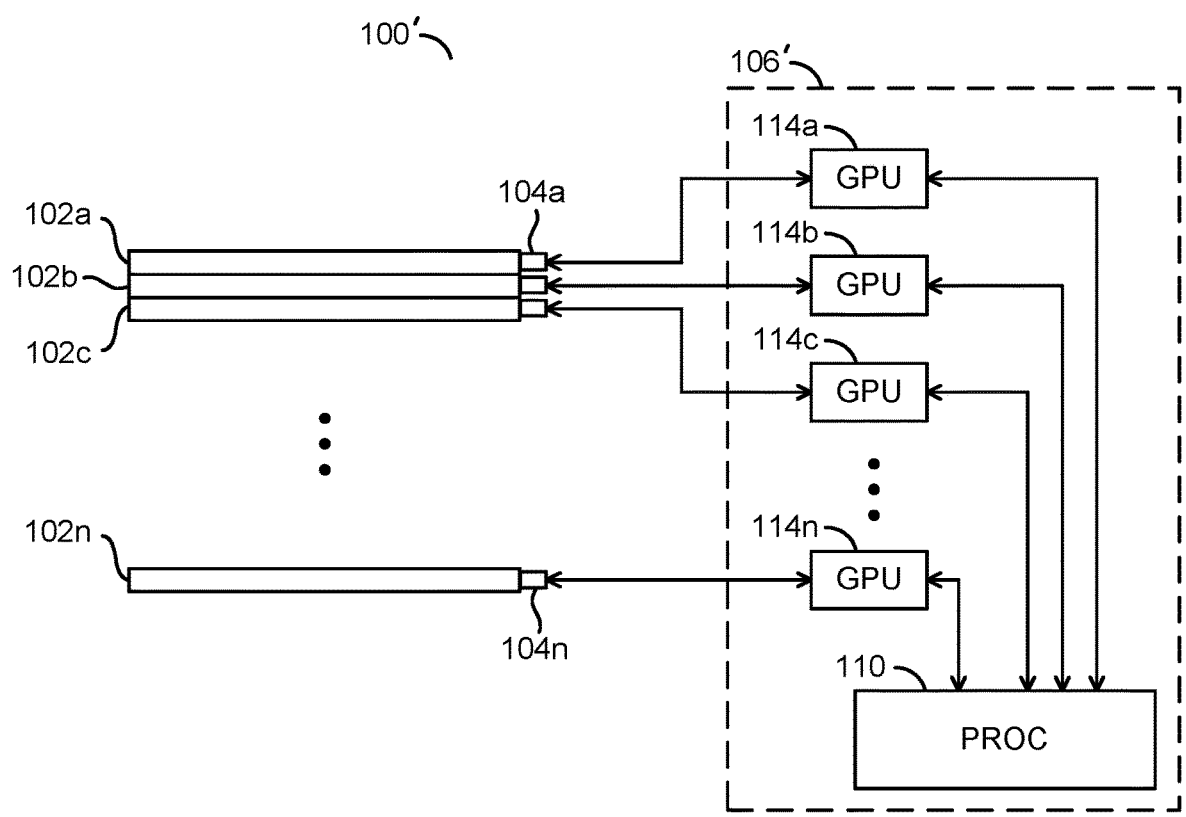
FIG. 2 is a block diagram illustrating an alternate embodiment of the present invention.

Referring to FIG. 2, a block diagram illustrating an alternate embodiment of the present invention is shown. An embodiment of the apparatus 100' is shown. The apparatus 100' may have a similar implementation as the real 3D display system 100 shown in association with FIG. 1. The apparatus 100' may comprise the display panels 102a-102n, the display interfaces 104a-104n and/or the display manager 106'.

The display manager 106' may comprise the processor 110 and/or a number of blocks (or circuits) 114a-114n. The circuits 114a-114n may each comprise a graphics processing unit (GPU). The display manager 106' may comprise other components (such as the memory 112, not shown).

The GPUs 114a-114n may comprise dedicated circuits designed to perform operations and/or functionality specific to displaying and/or rendering graphics. The GPUs 114a-114n may be configured to communicate with the display panels 102a-102n via the display interfaces 104a-104n. The GPUs 114a-114n may be configured to communicate data to/from the processor 110. The GPUs 114a-114n may be configured to generate graphical effects and/or enhancements. In an example, the GPUs 114a-114n may be configured to perform calculations and/or operations that may efficiently generate shading effects, filtering effects, smoothing effects, blurring effects, etc. The types of graphical effects implemented by the GPUs 114a-114n may be varied according to the design criteria of a particular implementation.

In the example shown, one of the GPUs 114a-114n may be implemented for a respective one of the display panels 102a-102n. In some embodiments, one or more of the GPUs 114a-114n may be configured to generate the graphics for more than one of the display panels 102a-102n (e.g., one GPU may be assigned to drive one, two, three, four or more of the display panels 102a-102n). Generally, for the display manager 106' with the GPUs 114a-114n, there may be a fixed number of the display panels 102a-102n (e.g., four of the displays 102a-102n may be implemented with four of the GPUs 114a-114n). In some embodiments, the GPUs 114a-114n may implement multiple video output ports, which may enable additional display panels to be connected. For example, when one of the display panels 102a-102n is connected, the display manager 106' may be configured to extend the resolution in a depth direction, instead of (or in addition to) an X or Y direction. In the example shown, each of the GPUs 114a-114n may be a discrete device (e.g., a discrete board that may be plugged into a socket in the display manager 106'). In some embodiments, the GPUs 114a-114n may be embedded devices separate from the processor 110. In some embodiments, the GPUs 114a-114n may be embedded devices implemented by the processor 110 (e.g., the processor 110 may implement an Accelerated Processing Unit that comprises general purpose processing and dedicated modules for graphical operations). The number, type and/or implementation of the GPUs 114a-114n may be varied according to the design criteria of a particular implementation.

Figure 3:
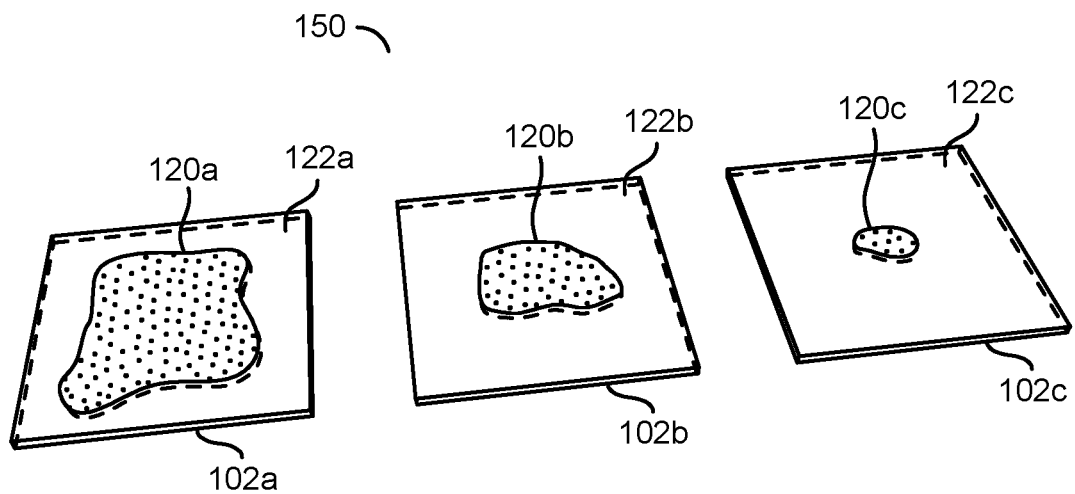
FIG. 3 is a diagram illustrating portions of a three dimensional effect for the video output displayed on multiple different display layers.

Referring to FIG. 3, a diagram illustrating portions of a three dimensional effect for the video output displayed on multiple different display layers is shown. A perspective view 150 is shown. The perspective view 150 may comprise a display panel 102a, a display panel 102b and a display panel 102c. The perspective view 150 may comprise the display panels 102a-102c arranged separately for illustrative purposes. In the example shown, the display panels 102a-102c may not be shown in the stacked formation.

Each of the display panels 102a-102c shown may comprise a respective portion 120a-120c of the graphical entity 50. The display panels 102a-102c may each comprise a layer implemented by a transparent OLED display. The display panels 102a-102c may comprise locations 122a-122c. The locations 122a-122c may be locations without the respective portions 120a-120c of the graphical entity 50. For example, the display panels 102a-102c may be transparent glass (or other transparent material). The display panels 102a-102c may be see-through, or mostly see-through at locations 122a-122c that do not have the portions 120a-120c of the graphical entity 50. The display panels 102a-102c may be opaque, or mostly opaque at the locations that have the portions 120a-120c of the graphical entity 50.

The portions 120a-120c of the graphical entity 50 may comprise the three dimensional effect of the graphical entity 50. The three dimensional effect generated by the display manager 106 may comprise separating and/or projecting the graphical entity 50 onto each of the display layers 102a-102n. The portions 120a-120c may be a layer and/or a slice of the graphical entity 50. In one example, the portions 120a-120c of the graphical entity 50 may comprise a color image. In another example, the portions 120a-120c of the graphical entity 50 may comprise a grayscale image. In yet another example, the portions 120a-120c of the graphical entity 50 may comprise a black and white image. In the example shown, the portions 120a-120c of the graphical entity 50 may comprise a generic shape as a representative example. The video output of the graphical entity 50 may be varied according to the design criteria of a particular area.

In the example shown, the portion 120a may be cover a large central area of the display panel 102a, the portion 120b may cover a smaller central area of the display panel 102b and the portion 120c may cover a smallest central area of the display panel 102c. Since the display panels 102a-102n may only enable seeing through to lower layers at the locations 122a-122c without the portions 120a-120c, the display manager 106 may determine the portions 120a-120c in an arrangement on the display panels 102a-102c such that the graphical entity is appropriately visible. For example, if the portion 120a is drawn on the top layer when the display panels 102a-102c are in the stacked formation, the portion 120b and the portion 120c may not be visible (e.g., the larger area of the portion 120a may obscure the portions 120b-120c). In the example shown, the display panel 102c may be the top layer, the display panel 102b may be the middle layer and the display panel 102a may be the bottom layer. In some embodiments, depending on the shape of the graphical entity 50, portions 120a-120c on top layers may partially or totally obscure the portions 120a-120c on lower layers.

When the display layers 102a-102c are stacked one top of the others, a thicker glass of the stacked formation may be generated with three pictures (e.g., the portions 120a-120c of the graphical entity 50), one on top of each other. Combining the portions 120a-120c across the display panels 102a-102c may provide the real 3D representation of the 3D graphical entity 50. The real 3D representation may change appearance when viewed from different perspectives.

The display manager 106 may be configured to convert the 3D graphical entity 50 in to the 3D graphical effect across the available display layers 102a-102c. The display manager 106 may determine the 3D graphical effect based on the available number of display layers 102a-102n (three in the example shown). The display manager 106 may determine a set of planes (conceptual planes) that correspond to the number of available display panels 102a-102c. In one example, a thickness of each plane may be divided equally across the depth of the graphical entity 50. The display manager 106 may determine an intersection between the 3D graphical entity 50 and each of the planes (e.g., where the graphical entity 50 overlaps with each of the planes). The intersection points may determine the 2D shape of the portions 120a-120c to be displayed on each of the display panels 102a-102c. In the example shown, the portion 120c may comprise a 2D shape of the intersection between a topmost portion of the 3D graphical entity 50 and a top plane, the portion 120b may comprise a 2D shape of the intersection between a middle portion of the 3D graphical entity 50 and a middle plane, and the portion 120a may comprise a 2D shape of the intersection between a bottom portion of the 3D graphical entity 50 and a bottom plane.

Figure 4:
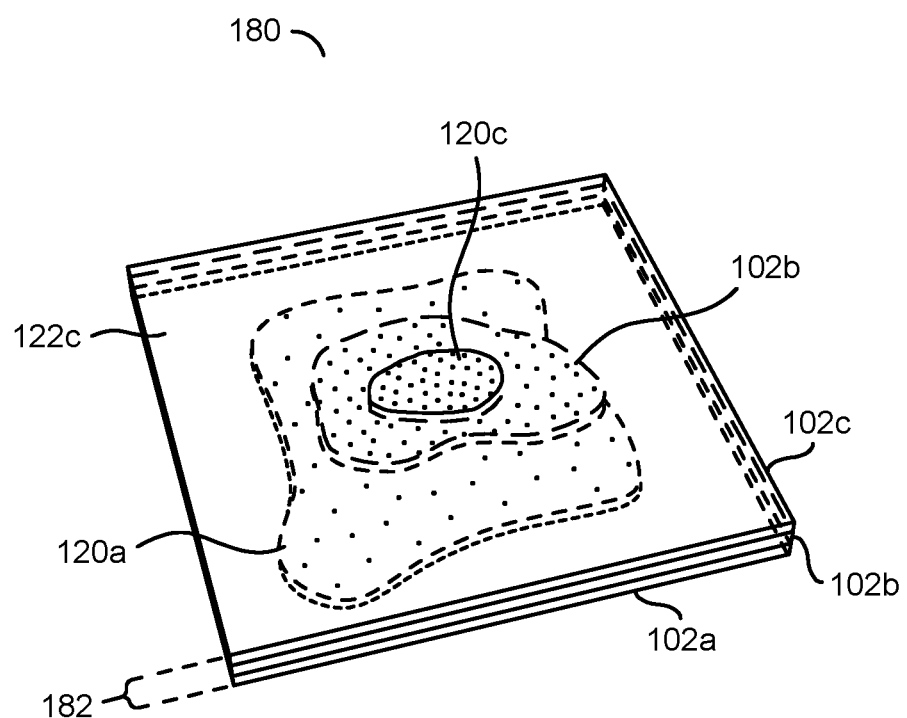
FIG. 4 is a diagram illustrating a perspective view of the three dimensional effect for the video output displayed on the stacked formation of the display layers.

Referring to FIG. 4, a diagram illustrating a perspective view of the three dimensional effect for the video output displayed on the stacked formation of the display layers is shown. A perspective view 180 is shown. The perspective view 180 may comprise the display panels 102a-102c. The display panels 102a-102c may comprise the video output of the portions 120a-120c of the 3D graphical entity 50 as described in association with FIG. 3.

The perspective view 180 may provide an example of the display panels 102a-102c as display layers in a stacked formation 182. The display panel 102c may be stacked as a top layer and directly on top of the display panel 102b. The display panel 102b may be stacked as a middle layer under the display panel 102c and on top of the display panel 102a. The display panel 102a may be stacked as a bottom layer and directly below the display panel 102b. When the display panels 102a-102c are arranged in the stacked formation 182, the stacked formation 182 may provide a thicker total depth of glass (or other material implementing the display panels 102a-102n). The stacked formation 182 may output the three portions 120a-120c combined as a single 3D representation of the graphical entity 50. Generally, the stacked formation 182 may comprise a total thickness of the each of the display layers 102a-102c.

From the perspective view 180, the top portion 120c may partially obscure the middle portion 120b of the 3D representation of the graphical entity 50. From the perspective view 180, the middle portion 120b may partially obscure the bottom portion 120a of the 3D representation of the graphical entity 50. The location 122c of the top display layer 102c that does not comprise the portion 120c of the graphical entity 50 is shown. The location 122c may be transparent. The transparent location 122c may enable the viewer to see through the top display layer 102c and into the middle display layer 102b (and lower layers). The portion 120b displayed on the middle display layer 102b may visible through the transparent location 122c of the top layer 102c. Similarly, the bottom portion 120a may be visible through both the transparent locations 122b-122c of the upper layers 102b-102c. How much of the portions 120a-120c are blocked (or obscured) by the upper portions 120a-120c may depend on the angle of the perspective of the viewer. For example, by viewing from another angle, different areas of the bottom portion 120c of the 3D graphical entity 50 may be visible.

In the example shown, the stacked formation 182 may comprise the display layers 102a-102n in an aligned stack. For example, each of the display layers 102a-102n may be the same size (e.g., a same length and width) and stacked directly onto each other such that each of the display layers 102a-102n completely cover the subsequent one of the display layers 102a-102n. In some embodiments, one or more of the display layers 102a-102n may not be perfectly aligned with the other display layers 102a-102n. In an example, a smaller sized display layer may be implemented in order to save cost for one or more of the display layers. For example, some graphical entities may be rendered at a specific location on a specific display layer (e.g., the portion of the graphical entity 50 may appear in a limited location). A smaller sized display layer implemented as part of the stacked formation 182 may enable the portion of the three dimensional effect to be provided in the limited area, while other (e.g., full-sized) layers may provide portions of the graphical entity 50 outside of the limited area.

Figure 5:
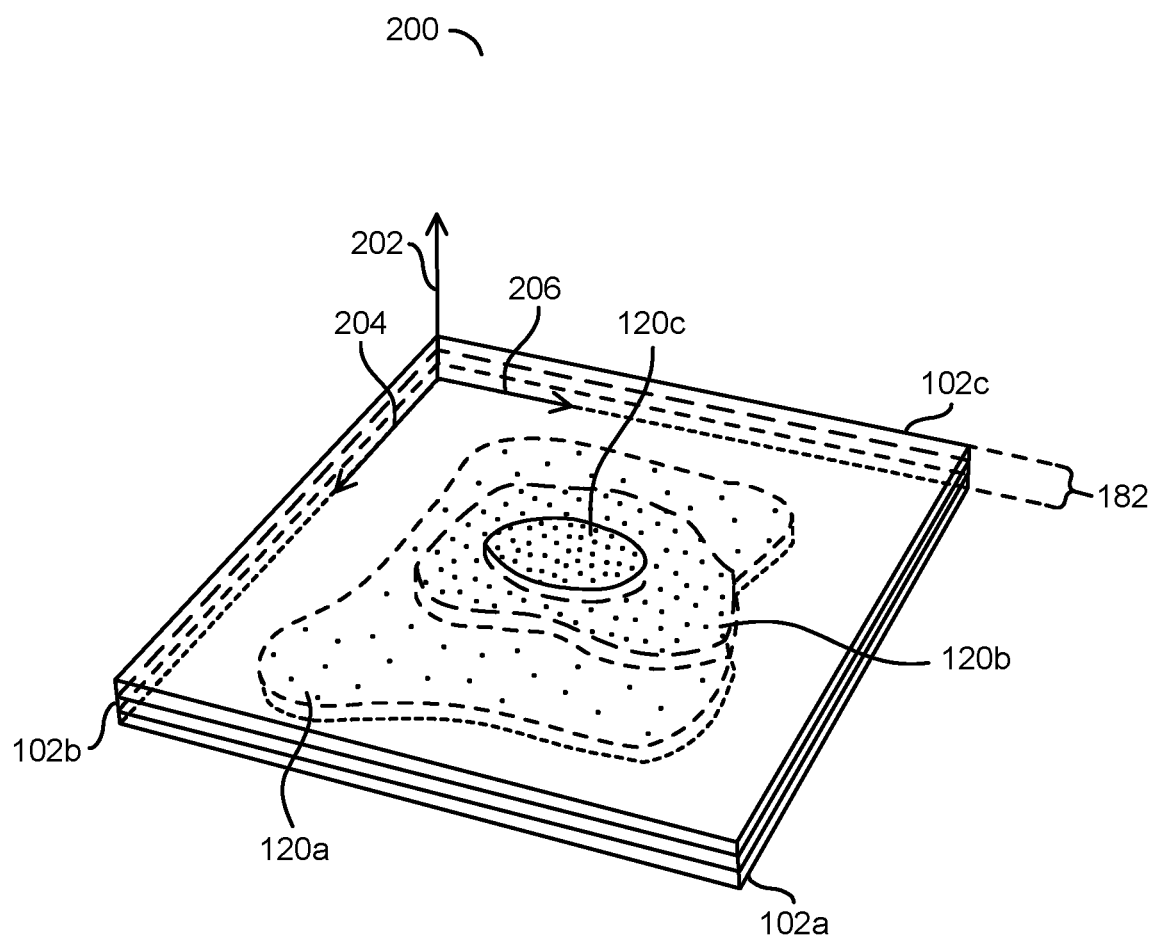
FIG. 5 is a diagram illustrating an alternate perspective view of the three dimensional effect for the video output displayed on the stacked formation of the display layers.

Referring to FIG. 5, a diagram illustrating an alternate perspective view of the three dimensional effect for the video output displayed on the stacked formation of the display layers is shown. A perspective view 200 is shown. The perspective view 200 may comprise the display panels 102a-102c in the stacked formation 182. The perspective view 200 may be similar to the perspective view 180 shown in association with FIG. 3, but viewed from a different angle.

Similar to the perspective view 180, in the perspective view 200, the top portion 120c of the 3D representation of the graphical entity 50 may partially obscure the middle portion 120b and the middle portion 120b may partially obscure the bottom portion 120a. Since the stacked formation 182 may be viewed from a different angle, different areas of the bottom portion 120a and the middle portion 120b may be visible. The stacked formation 182 may provide real depth to the portions 120a-120c of the graphical entity.

In some embodiments, the display manager 106 may determine which of the display layers 102a-102c to render each of the portions 120a-120c and/or how much of the portions 120a-120c to render on each layer based on distance and/or range information. For example, when the graphical entity 50 comprises an object (or objects) captured by a camera and/or other sensors (e.g., radar, LIDAR, ultrasonics, etc.) distance from the sensor may be determined. The video output displayed by the portions 120a-120c may represent how far from the sensor that the object was when captured. For example, portions of the object rendered on the top display layer 102c may be closer to the sensor and the portions of the object rendered on the bottom layer 102a may be farthest away from the sensor. In an example, the display manager 106 may be configured to determine sets of ranges based on the number of the display layers 102a-102c in the stacked formation 182. In the example shown, the stacked formation 182 may comprise three of the display layers 102a-102c and the display manager 106 may divide the distances into three sets of ranges (e.g., close may be distances from 1 m-5 m, middle may be distances from 5 m-10 m, and far may be distances greater than 10 m). The display manager 106 may determine the three dimensional effect for the graphical entity 50 by collapsing objects in the close range set to the top layer 102c, objects in the middle range set to the middle layer 102b and objects in the far range set to the bottom layer 102a. Since the information about the objects may already have three dimensional information, the display manager 106 may direct the video output onto the different layers 102a-102c.

Arrows 202-206 are shown at a corner of the stacked formation 182. The arrows 202-206 may represent axes. In an example, the arrow 202 may represent a depth axis (e.g., a Z axis), the arrow 204 may represent a length axis (e.g., an X axis) and the arrow 206 may represent a width axis (e.g., a Y axis). In the example shown, each of the display panels 102a-102c may have a same length, width and depth. The resolution in the X axis 204 and the Y axis 206 may be determined based on a size of each of the display panels 102a-102n. Generally, the resolution in the X axis 204 and the Y axis 206 may not be changed (e.g., unless each of the display panels 102a-102n are replaced by larger sized panels). The resolution in the Z axis 202 may be determined based on a number of the display layers 102a-102n in the stacked formation 182. In an example, the resolution in the Z axis 202 may be increased by adding more of the display panels 102a-102n to the stacked formation 182. Similarly, the resolution in the Z axis 202 may be reduced by removing one or more of the display panels 102a-102n from the stacked formation 182.

In one example, which portion of the graphical entity 50 to display on which of the display layers 102a-102n may be determined in real-time (e.g., for each cycle of the refresh rate for the display panels 102a-102n). In another example, which portion of the graphical entity 50 to display on which of the display layers 102a-102n may be determined periodically for a predetermined amount of time (e.g., the three dimensional effect may be calculated every minute and use the same three dimensional effect for the graphical entity 50 for the next minute). In yet another example, which portion of the graphical entity 50 to display on which of the display layers 102a-102n may be determined each time the graphical entity 50 changes. In still another example, the signal INPUT may be configured to trigger changing the three dimensional effect (e.g., as part of a user input, as part of an artificial intelligence model, etc.). How often and/or the circumstances for determining the three dimensional effect may be varied according to the design criteria of a particular implementation.

Figure 6:
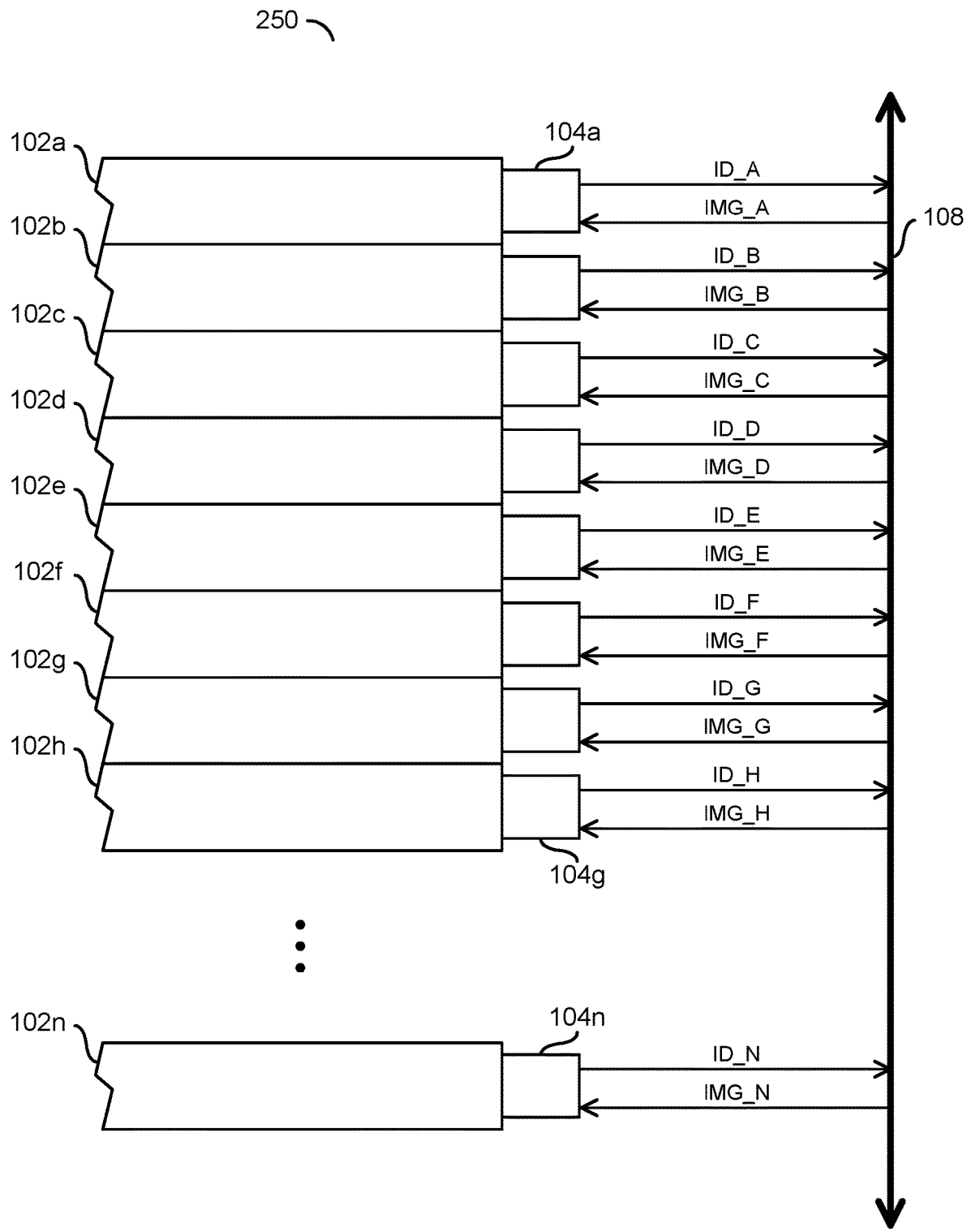
FIG. 6 is a block diagram illustrating data communicated between each display layer and a communications bus.

Referring to FIG. 6, a block diagram illustrating data communicated between each display layer and a communications bus is shown. Example data communication 250 is shown for the apparatus 100. The example data communication 250 may comprise the display panels 102a-102n, the display interfaces 104a-104n and/or the shared bus 108. The example data communication 250 may illustrate data communicated between the display panels 102a-102n and the display manager 106 over the shared bus 108.

Signals (e.g., IMG_A-IMG_N) are shown presented from the shared bus 108 to the display interfaces 104a-104n. The signals IMG_A-IMG_N may comprise video output data. The video output signals IMG_A-IMG_N may be generated by the display manager 106. The video output signals IMG_A-IMG_N may comprise the three dimensional effect (e.g., the portions 120a-120n) of the graphical entity 50. The video output signals IMG_A-IMG_N may comprise the video output that each of the display layers 102a-102n may output to create the real 3D depth effect. The video output signals IMG_A-IMG_N may be presented in a format that corresponds with the particular standard implemented by the display interfaces 104a-104n. The display interfaces 104a-104n may convert the data in the video output signals IMG_A-IMG_N into video output that may be displayed on the display panels 102a-102n. In the example data communication 250, the shared bus 108 may communicate the video output signals IMG_A-IMG_N. In embodiments that implement the fixed number of GPUs 114a-114n, the GPUs 114a-114n may communicate the video output signals IMG_A-IMG_N to the display interfaces 104a-104n.

Signals (e.g., ID_A-ID_N) are shown presented from the display interfaces 104a-104n to the shared bus 108. The signals ID_A-ID_N may comprise display metadata. The display metadata signals ID_A-ID_N may be generated by the display layers 102a-102n to provide the display manager 106 data about characteristics of each of the display panels 102a-102n. In an example, the display metadata signals ID_A-ID_N may comprise resolution information, color depth information, refresh rate information, an EDID, presence information, etc. The display metadata signals ID_A-ID_N may enable the display manager 106 to determine how to format the video output for the video output signals IMG_A-IMG_N. In the example data communication 250, the shared bus 108 may receive the display metadata signals ID_A-ID_N and present the display metadata signals ID_A-ID_N to the display manager 106. In embodiments that implement the GPUs 114a-114n, the GPUs 114a-114n may receive the display metadata signals ID_A-ID_N and may manage the communications with the display manager 106.

In the example data communication 250 that implements the shared bus 108, there may be a non-fixed a priori number of the display panels 102a-102n. For example, the resolution of the Z axis 202 may be changed by removing or adding the display panels 102a-102n in real time. In order for the display manager 106 to determine the three dimensional effect for the graphical entity 50, the display manager 106 may first determine a number of available display layers 102a-102n in the stacked formation 182.

The display manager 106 may determine the number of available display layers 102a-102n in the stacked formation 182 in response to the display metadata signals ID_A-ID_N. In one example, the display metadata signals ID_A-ID_N may comprise the presence information. The display interfaces 104a-104n may be configured to generate the display metadata signals ID_A-ID_N at regular intervals. For example, the presence information may inform the display manager 106 regularly (e.g., at periodic time intervals) about the number of the display layers 102a-102n (e.g., the resolution of the Z axis 202). In another example, the display metadata signals ID_A-ID_N may be generated in response to a ping sent by the display manager 106. For example, to learn the resolution of the Z axis 202, a ping may be sent over the shared bus 108 to each of the display interfaces 104a-104n when the display manager 106 requests a count of the number of display layers 102a-102n in the stacked formation 182. Generally, each of the display layers 102a-102n may have a unique address. The ping may be sent to the unique addresses to check for presence. The display interfaces 104a-104n may respond to the ping with the presence information via the display metadata signals ID_A-ID_N. For example, the display layers 102a-102n may behave as agents or nodes (e.g., slaves) that answer to the ping from the display manager 106.

Based on the presence information, the display manager 106 may determine the number of display layers 102a-102n that are present in the stacked formation 182. The number of the display layers 102a-102n may represent the resolution in the Z axis 202 (e.g., the Z resolution). The Z resolution may provide how much depth detail may be available to represent the 3D graphical entity 50.

Figure 7:
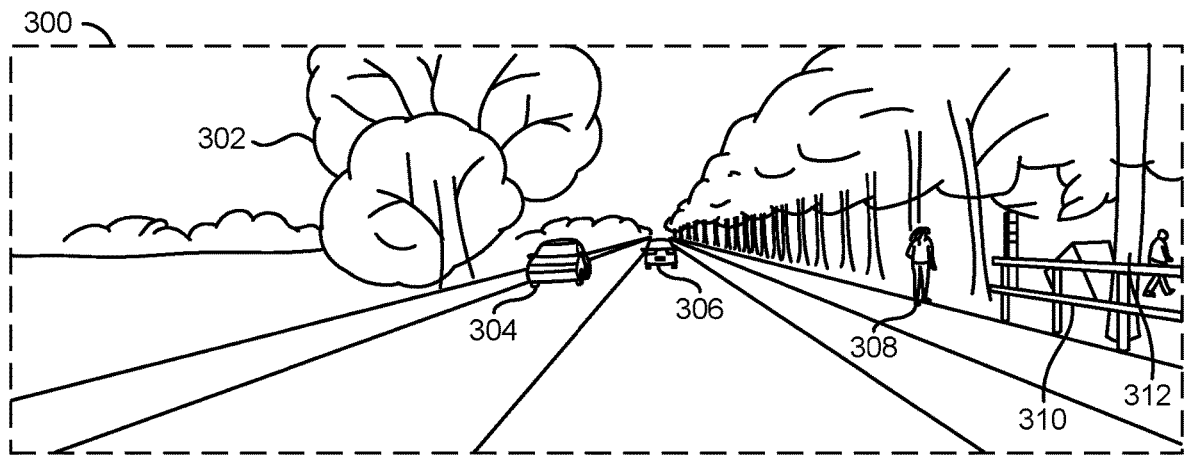
FIG. 7 is a diagram illustrating an example video frame.

Referring to FIG. 7, a diagram illustrating an example video frame is shown. A video frame 300 is shown. The video frame 300 may be a representative example of acquiring information about graphical entities to display on the apparatus 100. In one example, the display manager 106 may receive the video frame 300 and perform computer vision operations to determine objects to display on the display layers 102a-102n as graphical entities. In another example, the display manager 106 may receive the video frame 300 and determine distance (or range) information to use to determine the three dimensional effect. In some embodiments, other components (e.g., a dash camera that performs computer vision operations) may perform the object detection and/or determine distance information, which may be presented to the display manager 106. Generally, the video frame 300 may be a representative example of an input that may be converted to the graphical entity 50 that may be output by the apparatus 100.

The video frame 300 may comprise various objects at various distances from the camera that captured the video frame 300. In the example shown, the video frame 300 may comprise various objects 302-312. The objects 302-312 may comprise a tree 302, an approaching vehicle 304, a receding vehicle 306, a person 308, a fence 310 and a tree trunk 312. The types of the objects 302-312 may be representative examples of objects at various distances that may be output as the graphical entities displayed on the display layers 102a-102n.

In the example shown, the tree trunk 312, the fence 310 and the person 308 may be relatively close to the camera that captured the video frame 300. In the example shown, the tree 302 and the approaching vehicle 304 may be at a relative middle distance from the camera that captured the video frame 300. In the example shown, the receding vehicle 306 may be at a relatively far distance from the camera that captured the video frame 300. The display manager 106 may be configured to categorize, classify and/or encode various distances into multiple ranges of distances in response to an analysis of the objects 302-312 in the video frame 300 and/or in response to distance information received from the camera sensor. The number of sets of ranges may be determined by the display manager 106 based on the number of the display layers 102a-102n in the stack formation 182.

The video frame 300 may be one type of sensor input used to determine distance information. In some embodiments, an ultrasonic sensor may be implemented to determine distances. In some embodiments, a radar sensor may be implemented to determine distances. In some embodiments, a lidar sensor may be implemented to determine distances. In some embodiments, a combination of multiple sensors and/or multiple sensor types may be configured to determine distances. Generally, the source of the distance measurements may be irrelevant to the display manager 106. For example, the display manager 106 may be configured to receive an input from any type of sensor that provides a distance measurement in order to determine which of the display layers 102a-102n to draw the portions of the objects and/or the entire objects on.

Figure 8:
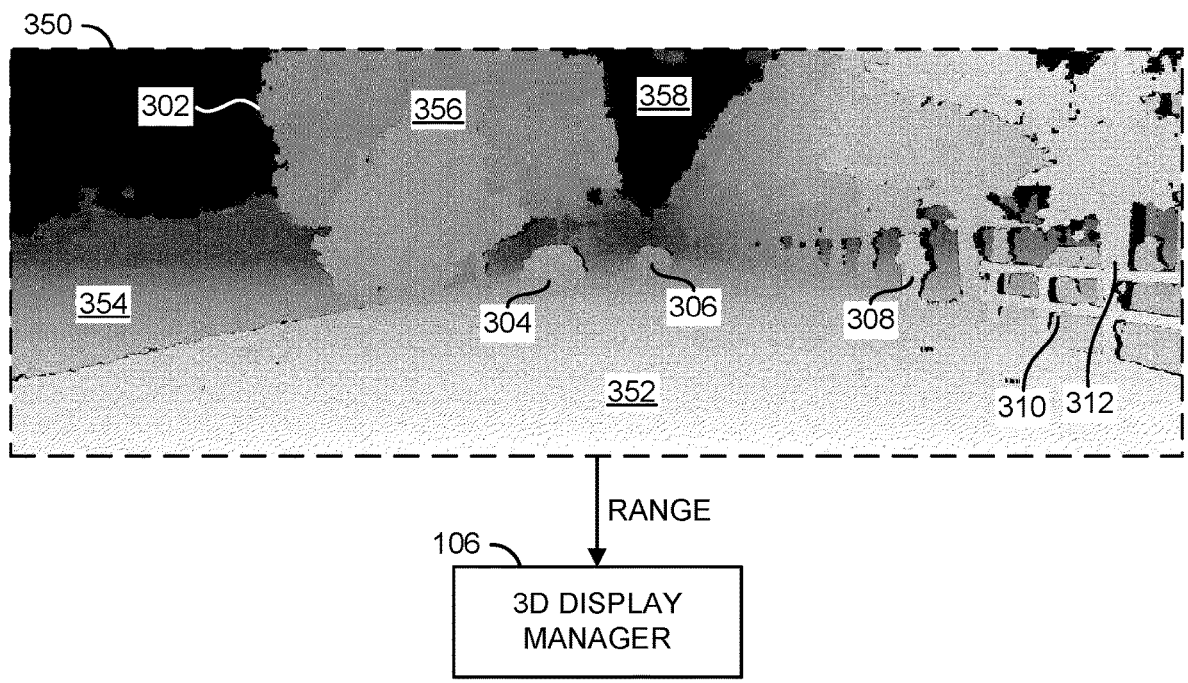
FIG. 8 is a diagram illustrating encoding a range of distances determined from a disparity image for each display layer.

Referring to FIG. 8, a diagram illustrating encoding a range of distances determined from a disparity image for each display layer is shown. An example disparity image 350 is shown. The disparity image 350 may be generated in response to the video frame 300 shown in association with FIG. 7. The disparity image 350 may represent distances from the lens of the camera that captured the video frame 300. In one example, the video frame 300 may be analyzed along with a second similar image from a slightly different perspective (e.g., a pair of stereo images) in order to generate the disparity image 350. In another example, the video frame 300 may be a monocular image analyzed using artificial intelligence and/or computer vision operations in order to generate the disparity image 350. In some embodiments, the processor 110 implemented by the display manager 106 may be configured to analyze the video frame 300. Details of determining disparity images using the processor 110 may be described in association with U.S. patent application Ser. No. 16/892,465, filed on Jun. 4, 2020, and U.S. patent application Ser. No. 17/000,495, filed on Aug. 24, 2020, appropriate portions of which are incorporated by reference. In some embodiments, an external processor may be configured to analyze the video frame 300 in order to generate the disparity image 350. The method of generating the disparity image 350 may be varied according to the design criteria of a particular implementation.

The disparity image 350 may comprise a color coded representation of the distances measured in the video frame 300. In the example shown, the color coding may be in grayscale for illustrative purposes. Generally, the color coding may provide a heatmap of distances measured. The particular color used for a particular distance may be varied according to the design criteria of a particular implementation.

The color coding for the distances may generally map to the various objects in the video frame 300 (e.g., since all the parts of one object may be located at generally the same particular distance from the camera). While the disparity image 350 may not directly illustrate the objects, the general shape of each object may be inferred from the color coding representing the distances. In the example disparity image 350, a general shape of the tree 302, the approaching vehicle 304, the receding vehicle 306, the person 308, the fence 310 and the tree trunk 312 may be distinguished.

A number of distance ranges 352-358 are shown. The distances ranges 352-358 may generally correspond to a particular color coding of the disparity image 350. In some embodiments, the disparity image 350 may comprise a gradient of colors representing granular distance measurements. For simplicity, the granular measurements may be categorized as the distance ranges 352-358. In some embodiments, a number of the distance ranges 352-358 may be selected by the display manager 106 to correspond to the number of the display layers 102a-102n in the stacked formation 182. Generally, each pixel of the disparity image 350 may encode a distance (e.g., from the camera lens) to the location and/or object represented by the pixel.

In the example shown, the range of distances 352 may be a closest distance. The tree trunk 312, the fence 310 and the person 308 may be in the closest distance range 352. In an example, the closest distance range 352 may be represented by red colors. In the example shown, the range of distances 354 may be a medium close distance. None of the objects may be in the medium close distance range 354 (e.g., the medium close distance range 354 may comprise an empty field). In an example, the medium close distance range 354 may be represented by yellow colors. In the example shown, the range of distances 356 may be a medium far distance. The tree 302 and the approaching vehicle 304 may be in the medium far range 356. In an example, the medium far range 356 may be represented by green colors. In the example shown, the range of distances 358 may be a farthest distance. The receding vehicle 306 may be in the farthest distance range 358. In an example, the farthest distance range 358 may be represented by blue colors. The particular colors used and/or particular distances ranges used may be varied according to a disparity engine that generated the disparity image 350 and/or a user preference.

In embodiments with an external processor or device determining the disparity image 350 and/or the encoded distance data, a signal (e.g., RANGE) may be presented to the display manager 106. The signal RANGE may comprise the encoded distance information from the disparity image 350. The display manager 106 may receive the signal RANGE. The display manager 106 may determine the three dimensional effect for the graphical entities (e.g., the pixels and/or the objects) in response the distance information in the signal RANGE.

The display manager 106 may be configured to select a range of distances to collapse onto each of the display layers 102a-102n. In an example, where the apparatus 100 implements four of the display layers 102a-102d (e.g., an equal number of display layers and ranges of distances), the display manager 106 may collapse each one of the range of distances 352-358 onto a different one of the display layers 102a-102d. In the example shown, the objects (e.g., the tree trunk 312, the fence 310 and the person 308, etc.) from the range of distances 352 may be collapsed onto the top display layer 102a, the second display layer 102b may not comprise objects since there may not be objects of interest in the medium close range of distances 354, the objects (e.g., the tree 302 and the approaching vehicle 304) from the range of distances 356 may be collapsed onto the third display layer 102c and the object (e.g., the receding vehicle 306) may be collapsed onto the bottom display layer 102d.

In some embodiments, the display manager 106 may reserve the bottom display layer (e.g., the display layer 102d if four layers are implemented) for background information. For example, even though portions of the road are close to the camera, the road, the field and the sky may be identified by the processor 110 as background details. The background details may be displayed on the bottom layer 102d. Then the objects may appear as three dimensional graphical entities on top of the background details. For example, the objects (e.g., the tree trunk 312, the fence 310 and the person 308, etc.) from the range of distances 352 may be collapsed onto the top display layer 102a, the objects (e.g., the tree 302 and the approaching vehicle 304) from the range of distances 356 may be collapsed onto the second display layer 102b and the object (e.g., the receding vehicle 306) may be collapsed onto the third display layer 102c in order to appear standing out from the background details collapsed onto the bottom layer 102d.

The distance information in the signal RANGE may comprise range data. In one example, the range data may comprise disparity information (as shown). In another example, the range data may comprise data generated by ultrasonic sensors. In yet another example, the range data may be generated by radar sensors. In still another example, the range data may be generated by lidar sensors. Generally, the range data may be generated by any device and/or sensor that generates distance measurements. The type of device implemented to generate the range data may be varied according to the design criteria of a particular implementation.

Figure 9:
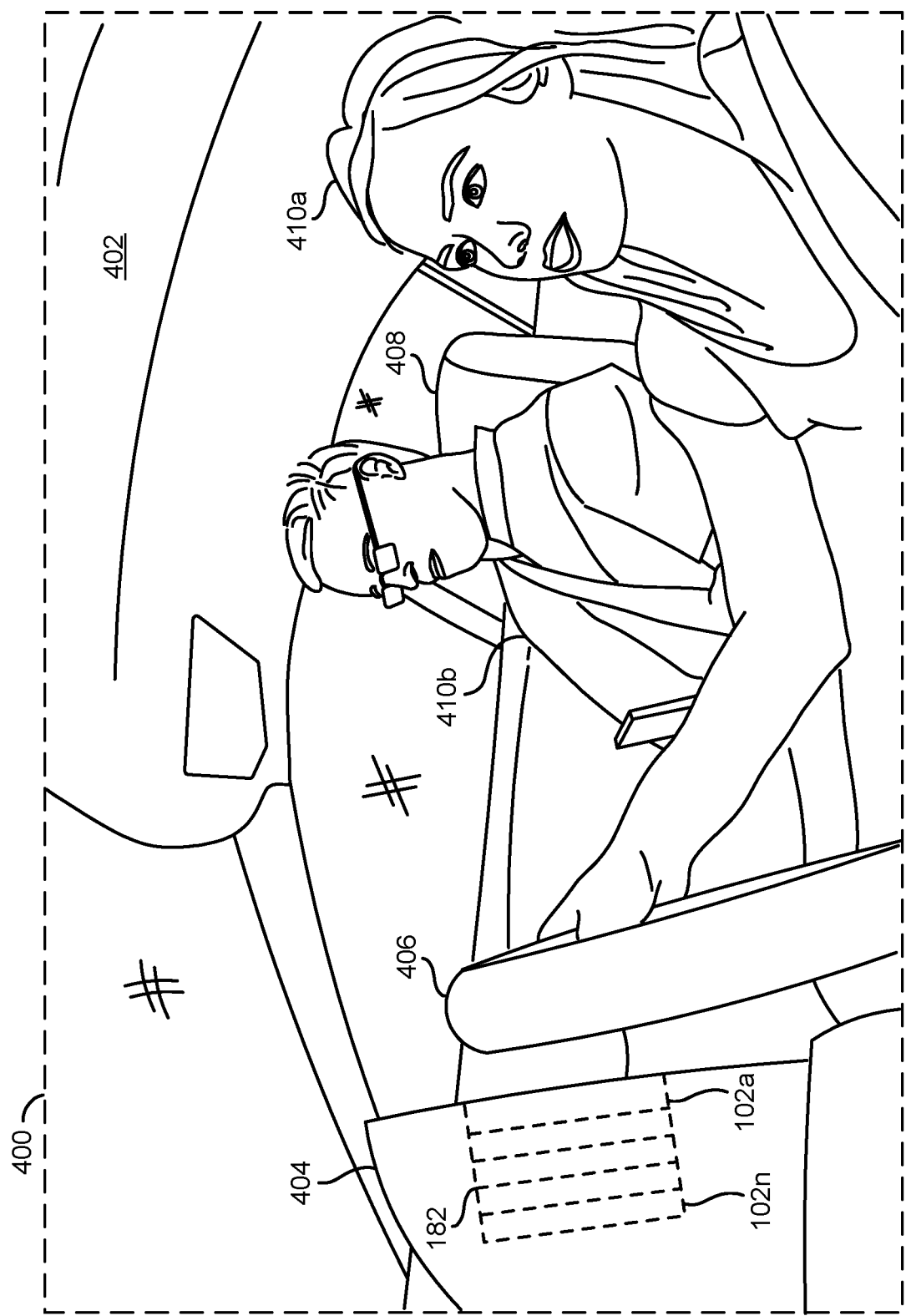
FIG. 9 is a diagram illustrating implementing the 3D display using stacked layers in vehicle.

Referring to FIG. 9, a diagram illustrating implementing the 3D display using stacked layers in vehicle is shown. A view 400 is shown. The view 400 may comprise a view of an interior of a vehicle 402. The interior of the vehicle 402 may comprise a dashboard 404, a steering wheel 406, a passenger seat 408 and/or vehicle occupants 410a-410b (e.g., a driver 410a and a passenger 410b).

The view 400 may illustrate one example implementation of the apparatus 100. The stacked formation 182 is shown implemented within the dashboard 404. The display panels 102a-102n may be embedded within the dashboard 404 and the depth of the stacked formation 182 may extend into the dashboard 404. The display layer 102a may be a front display layer. For example, the front display layer 102a may be visible on a surface of the dashboard 404 and/or may be closest to the driver 410a. In one example, the front display layer 102a maybe flush with the surface of the dashboard 404. The display panels 102b-102n may each be stacked behind the front display layer 102a deeper within the dashboard 404. For example, the bottom (or back) display layer 102n may be implemented the deepest distance within the dashboard 404.

In the example shown, the stacked formation 182 of the apparatus 100 may be located in the dashboard 404 and behind the steering wheel 406. For example, the example implementation of the apparatus 100 may be located generally where gauges such as a speedometer, a fuel gauge, etc. are located on a conventional vehicle. The apparatus 100 may be configured to display vehicle cockpit information on the multiple display layers 102a-102n. In one example, basic information may be displayed on the back layer 102n. Other information such as warning signals, traffic signs, route indications, incoming phone calls, etc. may be displayed in front of the background display layer 102n on the upper layers 102a-102m. In another example, the apparatus 100 may be configured to display a real 3D view of an all-around vehicle view that may be captured by cameras implemented around the vehicle 402. Details of capturing a three-dimensional all-around view of vehicle using stereo cameras may be described in association with U.S. patent application Ser. No. 14/867,183, filed on Sep. 18, 2015, appropriate portions of which are incorporated by reference. In yet another example, the apparatus 100 may be configured to display navigation and/or traffic information (e.g., roads may be displayed on the bottom display layer 102n, traffic information may be displayed on a next display layer, and the navigation information may be displayed on a next layer, etc.). In some embodiments, the stacked formation 182 may be implemented in the dashboard 404 in front of the passenger 410b and/or in between the occupants 410a-410b (e.g., on a center console and/or an infotainment system). The type of information displayed on the stacked formation 182 of the apparatus 100 may be varied according to the design criteria of a particular implementation.

Figure 10:
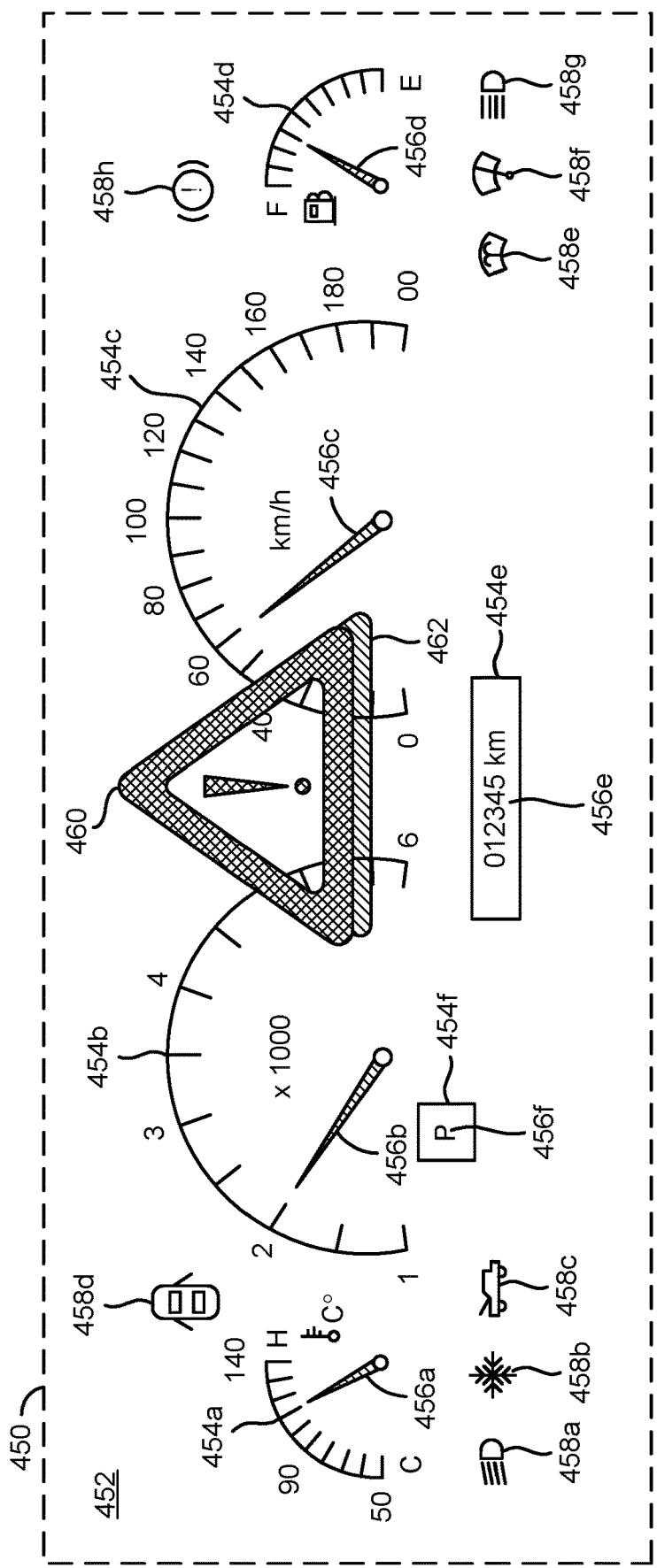
FIG. 10 is a diagram illustrating a graphical entity implemented on a top layer over background cockpit information for a vehicle.

Referring to FIG. 10, a diagram illustrating a graphical entity implemented on a top layer over background cockpit information for a vehicle is shown. A real 3D display 450 is shown. The real 3D display 450 may comprise the stacked formation 182 of the apparatus 100. In the example shown, the real 3D display 450 may be shown from a head on perspective. For example, a viewer may be looking into the top layer 102a and through to each of the display layers 102a-102n.

In the example shown, the real 3D display 450 may illustrate an example of a vehicle cockpit display. For example, the real 3D display 450 may be implemented within the dashboard 404 as shown in association with FIG. 9 (e.g., the real 3D display 450 may be shown from the perspective of the driver 410a). In the example shown, the real 3D display 450 may provide an example implementation of the apparatus 100 displaying vehicle cockpit information. The real 3D display 450 may display the vehicle cockpit information using a three dimensional effect that may enable additional context to the driver 410a and/or provide the graphical entities in a format that may draw attention to particular information.

Different types of the vehicle cockpit information may be displayed on different display layers. In the example shown, the stacked formation 182 may comprise at least three of the display layers 102a-102n. Additional of the display layers 102a-102n may be utilized based on the desired three dimensional effects. As one illustrative example, the real 3D display 450 may be described using an example implementing five of the display layers 102a-102e.

A background 452 may be displayed on the bottom display layer 102e. In one example, the background 452 may be a constant color. In another example, the background 452 may be a color gradient and/or an image (e.g., a 'wallpaper' image). For example, the background 452 may provide a first contrast color that may aid in highlighting the graphical entities displayed on the upper display layers. The background 452 may remain one single color, provide a color gradient and/or may be selected by an end-user. In one example, the background 452 may provide a black colored background.

The second display layer 102d may display background information entities 454a-454f. For example, the background information entities 454a-454f may be graphical entities that may be generally constant and/or data that may be modified rarely. In the example shown, the background information entity 454a may be a temperature gauge, the background information entity 454b may be a tachometer, the background information entity 454c may be a speedometer, the background information entity 454d may be a fuel/battery gauge, the background information entity 454e may be an odometer and/or the background information entity 454f may be a gear selection. For example, the background information entities 454a-454f may provide a template for displaying traditional cockpit information. The background entity information entities 454a-454f may be generally constant, but may be modified. For example, the background information entities 454a-454f may be changed to different units (e.g., miles/kilometers) based on a user preference and/or a location of the vehicle. The background information entities 454a-454f may be displayed in a different color than the background 452. The background information entities 454a-454f may stand out from the background 452 by being implemented on the second display layer 102d, which may be physically above the bottom display layer 102e.

The third layer (e.g., the middle layer) 102c may display the real-time data 456a-456f. The real-time data 456a-456f may correspond to the background information entities 454a-454f. The real-time data 456a-456f may provide the data readings associated with the background information entities 454a-454f. The real-time data 456a-456f may be updated regularly and/or constantly. In the example shown, the real-time data 456a may provide the temperature gauge reading for the background information entity 454a of the temperature gauge, real-time data 456b may provide the RPM gauge reading for the background information entity 454b of the tachometer, the real-time data 456c may provide the speed reading for the background information entity 454c of the speedometer, the real-time data 456d may provide the fuel/battery charge remaining for the background information entity 454d of the fuel/battery gauge, real-time data 456e may provide the mileage value of the background information entity 454e of the odometer and/or the real-time data 456f may provide the current gear of the background information entity 454f of the gear selection. In some embodiments, the real-time data 456a-456f may be communicated to the display manager 106 from a CAN bus of the vehicle 402. Since the real-time data 456a-456f may be on the display layer 102c, which may be physically above the background information entities 454a-454f, the real-time data 456a-456f may be displayed with prominence. The physically closer rendering of the real-time data 456a-456f, compared to the background 452 and the background information entities 454a-454f, may draw attention to the actual readings of the data.

The fourth layer 102b may display signal warnings 458a-458h. The signal warnings 458a-458h may be displayed relatively rarely, but may be important data. The signal warnings 458a-458h may be data that may be received by the display manager 106 from the CAN bus of the vehicle 402. In the example shown, the signal warnings 458a-458h may comprise light indicators 458a, heating/cooling indicators 458b, a trunk open indicator 458c, a door ajar indicator 458d, a low washer fluid warning 458e, a wiper indicator 458f, a high-beam indicator 458g, a brake warning 458h, etc. Since the signal warnings 458a-458h may be on the display layer 102b, which may be physically above the background information entities 454a-454f and the real-time data 456a-456f, the signal warnings 458a-458h may be displayed with prominence. The fourth layer 102b may be transparent at the locations of the signal warnings 458a-458h when the particular signal warnings 458a-458h are inactive. The locations of the signal warnings 458a-458h of the fourth layer 102b may be opaque when the particular signal warnings 458a-458h are active. The physically closer rendering of the signal warnings 458a-458h may draw attention to the warnings.

The top layer 102a may display an alert 460. In the example shown, the alert 460 is shown drawn overtop of the tachometer 454b and the speedometer 454c. In one example, the alert 460 may comprise a big exclamation mark rendered in a red color. The alert 460 may be generated in response to an event that may be intended to draw the immediate attention of the driver. For example, the alert 460 may be rendered on the top layer 102a in response to an impact imminent detection. In another example, the alert 460 may be rendered on the top layer 102a in response to an emergency warning (e.g., an Amber alert, a police warning, a vehicle failure issue, etc.). The reason for rendering the alert 460 may be varied according to the design criteria of a particular implementation.

The rendering of the graphical entity for the alert 460 may be displayed as the most prominent of the graphical entities on the top display layer 102a in order to appear close to the driver 410a to draw immediate attention. When the alert 460 is not active, the top layer 102a may be transparent. The location of the alert 460 on the top layer 102a may become opaque when the alert 460 is rendered, while the other locations of the top layer 102a may be transparent. Generally, the processor 110 may determine the most important data to display (e.g., the alert 460) and display the most important data on the top layer 102a. Less important data may be displayed on the subsequent layers 102b-102e to enable more important data to be displayed in front of less important data. The location, shape and/or design of the alert 460 may be varied according to the design criteria of a particular implementation.

In the example described with the five display layers 102a-102e, the alert 460 may displayed with a Z axis 202 depth of a single layer (e.g., on the top layer 102 only). In some embodiments, depending on the number of display layers 102a-102n implemented, the various graphical entities may be rendered to have a depth (or thickness) by drawing the graphical entity on multiple display layers. In an example implementing seven of the display layers 102a-102n, the alert 460 may be rendered on each of the top three layers to give a Z depth of three layers. The alert 460 may appear as a thick symbol on top of the other graphical entities on the lower display layers. The thickness of each graphical entity may be determined by the display manager 106.

A visual effect 462 is shown. The visual effect 462 may correspond with the alert 460. For example, the alert 460 may be drawn on the top display layer 102a and the visual effect 462 may be rendered under the alert 460 on the lower display layers 102b-102e. In an example, the alert 460 may be displayed in a red color and the associated visual effect 462 may be rendered in grayscale (e.g., to create a shadow effect under the alert 460). To enhance the 3D effect, the alert 460 may be rendered as an outline shape, but not filled and the visual effect 462 may be the same shaped object (e.g., the warning sign) but displayed on the back layers 102b-102e in a blurred and black color, creating a shadow effect of the foreground warning sign. In another example, the visual effect 462 may comprise a dimmed shape and/or a blurred shape under the alert 460 (e.g., to create a dimming effect and/or a blur effect). The visual effect 462 may be implemented in order to enhance the effect of the important information of the alert 460.

In some embodiments, the real 3D display 450 may implement a user interface (e.g., for an infotainment system). In an example, a 3D effect may be implemented to display a button that has multiple display states. For example, the button may be collapsed onto the back display layer 102n to illustrate that the button is currently being pressed. In another example, the button may be drawn onto multiple of the display layers 102a-102n (e.g., with a Z depth) to indicate that the button is available to be pressed (e.g., in an unpressed state).

In some embodiments, the alert 460 may be rendered in a limited area. For example, the top display layer 102a may be implemented with a smaller size (e.g., smaller than the display layers 102b-102e in the direction of the X axis 204 and the Y axis 206). Since the alert 460 may not be rendered over the entirety of the X axis 204 and the Y axis 206 of the display layers 102b-102e, the top display layer 102a may be implemented with the smaller size in order to reduce cost. For example, the background 452 and/or the background information entities 454a-454f may be displayed over the entire cockpit display area and may be implemented using a full-sized display panel, while the alert 460 may be rendered on the limited area and may be implemented on a smaller sized display panel. Even with the smaller sized display panel 102a, the capability of showing the alert 460 with the three dimensional effect may be maintained.

Figure 11:
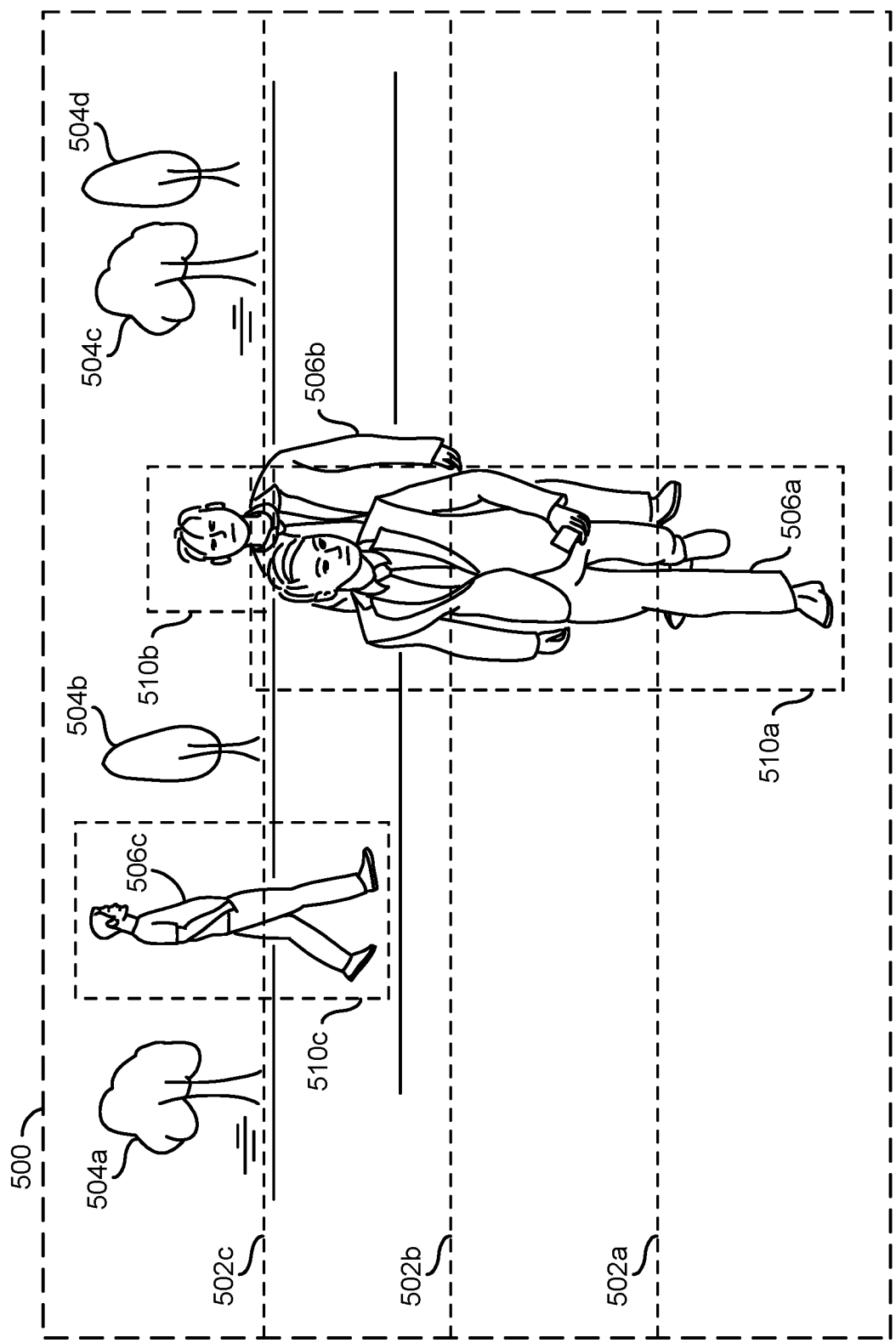
FIG. 11 is a diagram illustrating graphical entities implemented on various display layers that correspond with distances of detected objects from a camera.

Referring to FIG. 11, a diagram illustrating graphical entities implemented on various display layers that correspond with distances of detected objects from a camera is shown. An example display 500 is shown. The example display 500 may comprise another example of the apparatus 100 implementing a real 3D display for a security camera, a surveillance camera and/or doorbell camera.

The real 3D security display 500 may be configured to display graphical entities representing video data captured by a security camera and/or a doorbell camera. For example, the security camera and/or the doorbell camera may capture video frames and depth information may be provided and/or generated to enable the display manager 106 to determine the three dimensional effect that may display the background on the farthest layer 102n, while people and/or other objects may be drawn on the upper layers. For example, for a video doorbell, a person ringing at the door may be displayed on the closest layer 102a. In an example, the graphical entity 50 displayed on the real 3D security display 500 may comprise a layered three dimensional form generated in response to range data.

The real 3D security display 500 may comprise dashed horizontal lines 502a-502c. The dashed horizontal lines 502a-502c may provide an illustrative example of reference lines representing different ranges of distances. For example, the dashed horizontal lines 502a-502c may provide illustrative context, but may not be actually displayed on the real 3D security display 500. In the example shown, the horizontal lines 502a-502c may separate the video frame into four ranges of distance (e.g., predefined distances). For example, if the stacked formation 182 comprises four of the display layers 102a-102d, then the objects in front of the horizontal line 502a may be collapsed onto the top layer 102a, the objects in between the horizontal lines 502a-502b may be collapsed onto the second layer 102b, the objects in between the horizontal lines 502b-502c may be collapsed onto the third layer 102c and the objects behind the horizontal line 502c may be collapsed onto the back layer 102d.

The real 3D security display 500 may comprise background objects 504a-504d. The background objects 504a-504d may comprise graphical entities that may be at a fixed location. In the example shown, the background objects 504a-504d may be trees that may be far away from the security/doorbell camera. In some embodiments, the background objects may not necessarily be far away from the security/doorbell camera. For example, in some embodiments, the ground and sky may be drawn on the background layer. Rendering the ground and/or the sky in addition to the background objects 504a-504d on the bottom layer 102d may allow the graphical entities in the foreground (e.g., people, vehicles, animals, etc.) to be displayed on the upper display layers with prominence to provide the real depth effect.

People 506a-506c are shown. The people 506a-506c may represent the graphical entities that may be rendered on the display layers 102a-102d. In the example shown, the person 506a may be closest to the security/doorbell camera. The person 506b may be behind (and partially obscured by) the person 506a. The person 506c may be farthest away from the security/doorbell camera but in front of the trees 504a-504d.

In the example shown, the person 506a may be at a distance in front of the horizontal line 502a, the person 506b may be at a distance in between the horizontal lines 502a-502b, the person 506c may be at a distance in between the horizontal lines 502b-502c and the trees 504a-504d may be at a distance behind the horizontal line 502c.

In some embodiments, an external device may be configured to detect objects in a video frame. In some embodiments, the processor 110 may be configured to analyze a video frame received from the security/doorbell camera. For example, the processor 110 may be configured to perform computer vision operations to detect objects that may be displayed as the graphical entities on the display layers 102a-102n. The computer vision operations performed by the processor 110 may be configured to detect objects, determine a position and/or location of an object within a video frame (or multiple video frames), determine a distance that an object is located from a lens of the security/doorbell camera, etc. The processor 110 may be configured to implement a convolutional neural network configured to implement an artificial intelligence module that may detect particular types of objects. Details of the implementation of the processor 110 and/or the computer vision operations performed may be described in association with U.S. patent application Ser. No. 17/982,592, filed on Nov. 11, 2022 and U.S. patent application Ser. No. 17/324,605, filed on May 19, 2021, appropriate portions of which are incorporated by reference.

Dotted boxes 510a-510c are shown. The dotted boxes 510a-510c may represent the computer vision operations (e.g., performed by the processor 110) to detect objects in the video frame. The processor 110 may be configured to detect features and/or descriptors in the video frames and compare the features and/or descriptors against the features and/or descriptors learned from training data in order to recognize the pixels of the video frame that correspond to the particular type(s) of objects of interest. In the example shown, the type of object of interest may be the people 506a-506c. The dotted boxes 510a-510c are shown for illustrative purposes. In an example, the dotted boxes 510a-510c may be a visual representation of the object detection (e.g., the dotted boxes 510a-510c may not appear on an output video frame displayed on one of the display layers 102a-102d). In another example, the dotted boxes 510a-510c may be a bounding box generated by the processor 110 displayed on the real 3D security display 500 to indicate that an object has been detected (e.g., the bounding boxes 510a-510c may be displayed in a debug mode of operation). The number and/or types of objects detected by the processor 110 may be varied according to the design criteria of a particular implementation.

Based on the locations of the bounding boxes 510a-510c, the processor 110 may be configured to determine a location (e.g., a location for the X axis 204 and the Y axis 206) for the people 506a-506c to be drawn on the display layers 102a-102d. Based on a distance of the bounding boxes 510a-510c, the processor 110 may be configured to determine distance (e.g., a depth on the Z axis 202) for the people 506a-506c to be drawn on the display layers 102a-102d. The processor 110 may define the distances for the set of ranges (e.g., represented by the horizontal lines 502a-502c). The processor 110 may be configured to compare the distances of the people 506a-506c to the set of ranges to determine which of the display layers 102a-102d to render the graphical entities of the people 506a-506c on. Rendering the graphical entities of the people 506a-506c according to the range data may enable the display layers 102a-102n to output the graphical entities as a layered three dimensional form.

In the example shown, the bounding box 510a may be in front of the horizontal line 502a (e.g., within the closest range of distances). The processor 110 may determine to collapse the rendering of the graphical entity 50 for the person 506a onto the top display layer 102a. The processor 110 may generate the signal IMG_A for the unique address of the display layer 102a in order to render the graphical entity 50 for the person 506a.

In the example shown, the bounding box 510b may be behind the horizontal line 502a and in front of the horizontal line 502b (e.g., within the second closest range of distances). The processor 110 may determine to collapse the rendering of the graphical entity 50 for the person 506b onto the second display layer 102b. The processor 110 may generate the signal IMG B for the unique address of the display layer 102b in order to render the graphical entity 50 for the person 506b.

In the example shown, the bounding box 510c may be behind the horizontal line 502b and in front of the horizontal line 502c (e.g., within the second farthest range of distances). The processor 110 may determine to collapse the rendering of the graphical entity 50 for the person 506c onto the third display layer 102c. The processor 110 may generate the signal IMG C for the unique address of the display layer 102c in order to render the graphical entity 50 for the person 506c.

Figure 12:
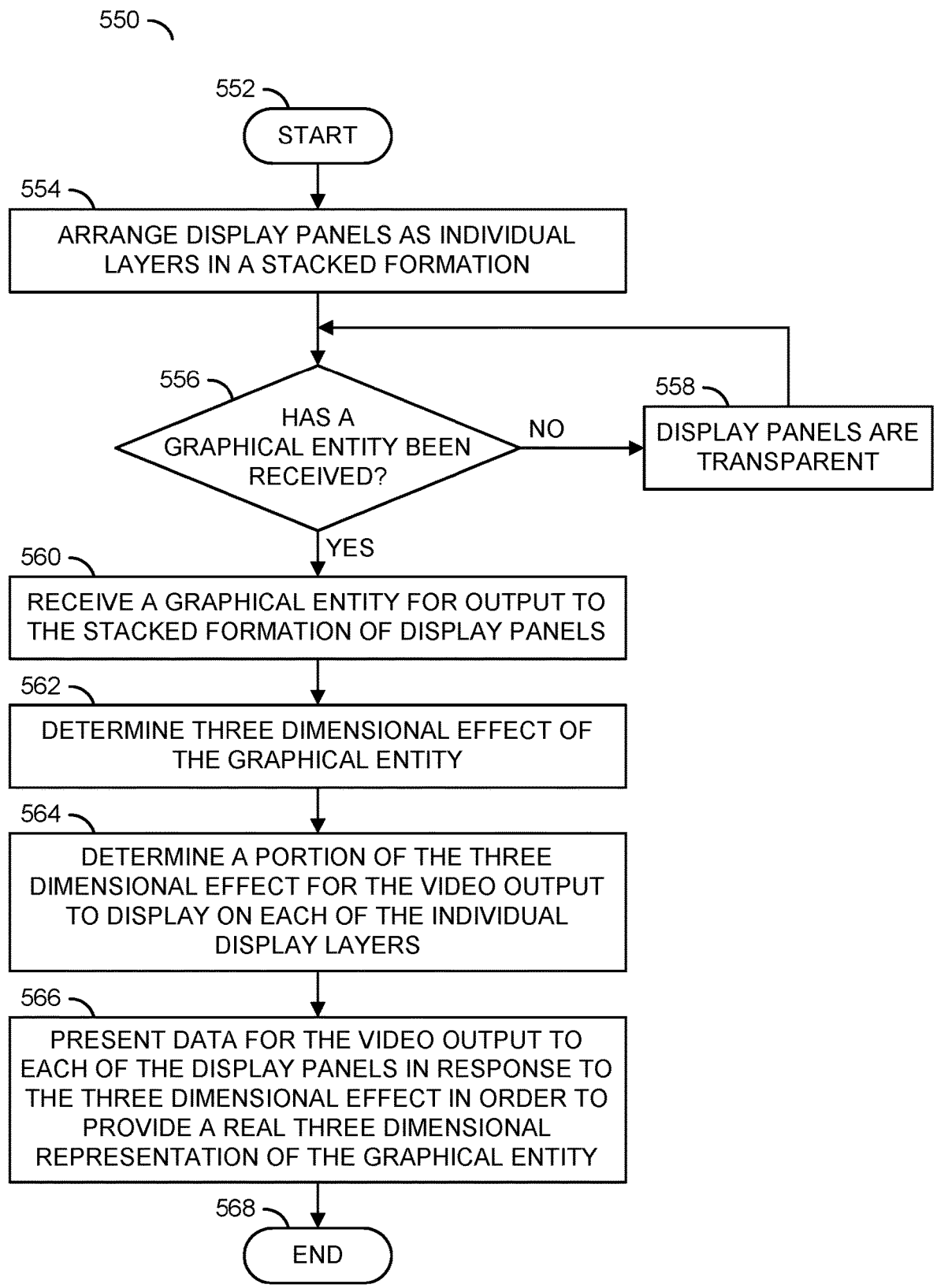
FIG. 12 is a flow diagram illustrating a method for implementing a 3D display using stacked layers.

Referring to FIG. 12, a method (or process) 550 is shown. The method 550 may implement a 3D display using stacked layers. The method 550 generally comprises a step (or state) 552, a step (or state) 554, a decision step (or state) 556, a step (or state) 558, a step (or state) 560, a step (or state) 562, a step (or state) 564, a step (or state) 566, and a step (or state) 568.

The step 552 may start the method 550. In the step 554, the display panels 102a-102n may be arranged as individual layers in the stacked formation 182. In an example, the display layers 102a-102n may be installed in the dashboard 404 of the vehicle 402. In another example, the display layers 102a-102n may be installed within an ATM. In yet another example, the display layers 102a-102n may be installed as part of a digital kiosk. Next, the method 550 may move to the decision step 556.

In the decision step 556, the processor 110 may determine whether the graphical entity 50 has been received. In one example, the processor 110 may be configured to receive pixel data arranged as video frames (e.g., the processor 110 may be a video processor for a camera). In another example, the processor 110 may receive range data. In yet another example, the processor 110 may receive data points from a software program. If the graphical entity 50 has not been received, then the method 550 may move to the step 558. In the step 558, the display panels 102a-102n may each be transparent. In one example, the processor 110 may not present the video output data signals IMG_A-IMG_N to the display panels 102a-102n and all the display panels 102a-102n may be transparent. In another example, the processor 110 may present the background data for the bottom display panels (e.g., the bottom display panel 102n may not be transparent and may display a standard black background or other content that may be selected for the background). Next, the method 550 may return to the decision step 556. In the decision step 556, if the graphical entity 50 has been received, then the method 550 may move to the step 560.

In the step 560, the processor 110 may receive the graphical entity 50 for output to the stacked formation 182 of the display panels 102a-102n. Next, in the step 562, the processor 110 may determine the three dimensional effect for the graphical entity 50. For example, the three dimensional effect may comprise determining how to display the graphical entity 50 across the various display layers 102a-102n. Next, the method 550 may move to the step 564.

In the step 564, the processor 110 may determine a portion of the three dimensional effect for the video output to display on each of the individual display layers 102a-102n. In one example, range data may be used to determine the three dimensional effect. In another example, calculating intersections with conceptual planes may be used to determine the three dimensional effect. In yet another example, the number of the display layers 102a-102n that may be currently addressable may be used to determine the three dimensional effect. Next, in the step 566, the processor 110 may present the video output signals IMG_A-IMG_N to each of the corresponding display layers 102a-102n via the shared bus 108 (or via one or more of the GPUs 114a-114n) in response to the three dimensional effect. Providing the video output signals IMG_A-IMG_N to the display layers 102a-102n in response to the three dimensional effect may provide a real three dimensional representation of the graphical entity 50. Next, the method 550 may move to the step 568. The step 568 may end the method 550.

Figure 13:
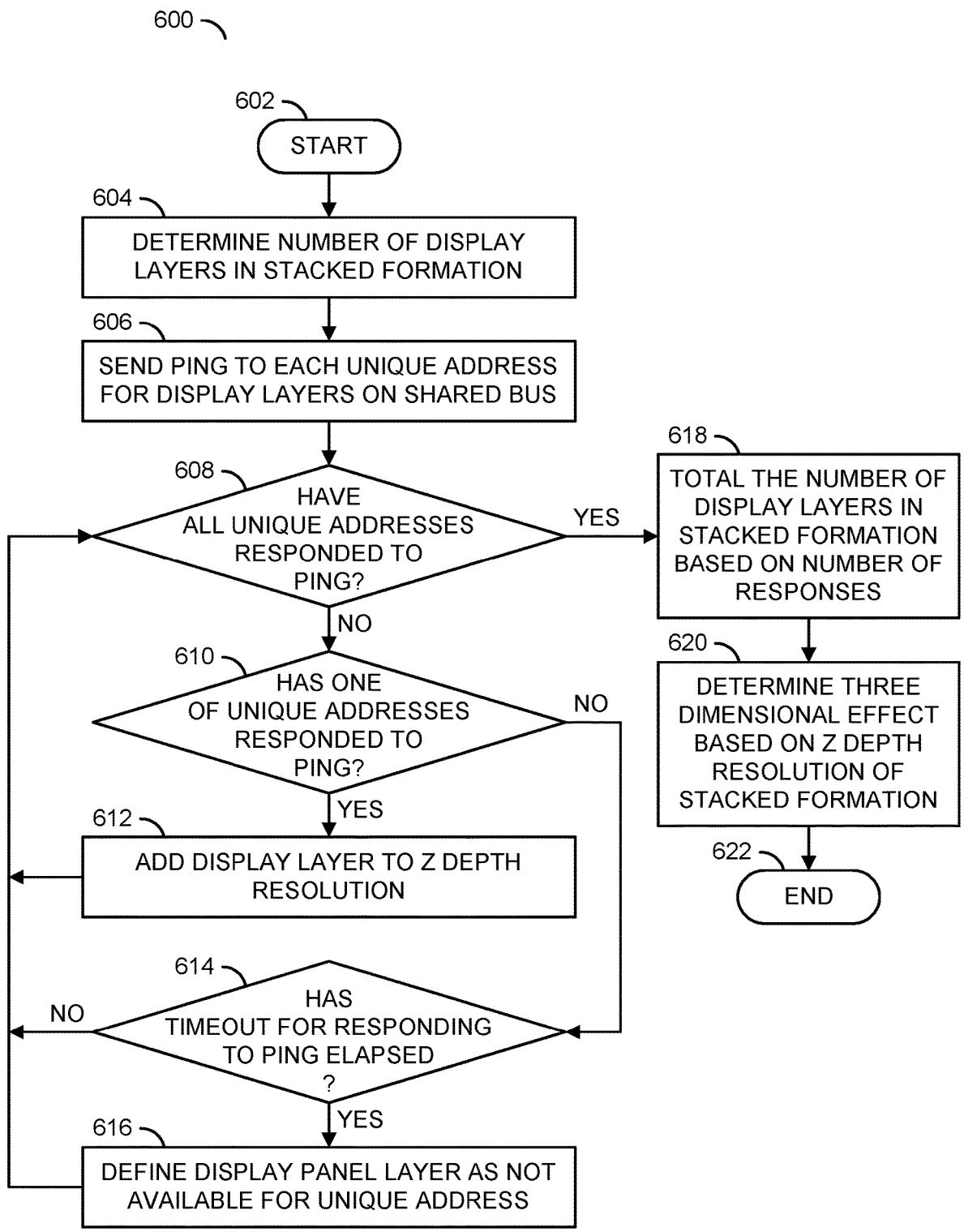
FIG. 13 is a flow diagram illustrating a method for determining a number of display layers in a stacked formation.

Referring to FIG. 13, a method (or process) 600 is shown. The method 600 may determine a number of display layers in a stacked formation. The method 600 generally comprises a step (or state) 602, a step (or state) 604, a step (or state) 606, a decision step (or state) 608, a decision step (or state) 610, a step (or state) 612, a decision step (or state) 614, a step (or state) 616, a step (or state) 618, a step (or state) 620, and a step (or state) 622.

The step 602 may start the method 600. In the step 604, the display manager 106 may initiate determining the number of the transparent display panels 102a-102n in the stacked formation 182. Next, in the step 606, the processor 110 may present the signals IMG_A-IMG_N comprising a ping to each unique address available to the display manager 106 via the shared bus 108. For example, each of the display interfaces 104a-104n, if present, may occupy one of the unique addresses on the shared bus 108 and receive the ping. Next, the method 600 may move to the decision step 608.

In the decision step 608, the processor 110 may determine whether all of the unique addresses have responded to the ping (or timed out). If each of the unique addresses has not either responded or timed out in response to the ping, then the method 600 may move to the decision step 610. In the decision step 610, the processor 110 may determine whether one of the unique addresses has responded to the ping. For example, the display interfaces 104a-104n may generate the signals ID_A-ID_N in response to the ping. If one of the unique addresses has responded to the ping, then the method 600 may move to the step 612. In the step 612, the display manager 106 may add one of the display layers 102a-102n to the Z depth resolution in response to the ping. Next, the method 600 may return to the decision step 608. In the decision step 610, if one of the unique addresses has not responded to the ping, then the method 600 may move to the decision step 614.

In the decision step 614, the processor 110 may determine whether a timeout for responding to the ping has elapsed. In an example, the timeout may be a predetermined amount of time (e.g., one second, a number of milliseconds, one refresh cycle of the displays 102a-102n, etc.). If the timeout for responding to the ping has not elapsed, then the method 600 may return to the decision step 608. In the decision step 614, if the timeout for responding to the ping has not elapsed, then the method 600 may move to the step 616. In the step 616, the display manager 106 may define each of the unique addresses for the display layers 102a-102n that did not respond to the ping as unavailable. Next, the method 600 may return to the decision step 608.

In the decision step 608, if all of the unique addresses have responded to the ping (or timed out), then the method 600 may move to the step 618. In the step 618, the display manager 106 may total the number of the display layers 102a-102n in the stacked formation 182 based on the number of responses. Next, in the step 620, the processor 110 may determine the three dimensional effect for the graphical entity 50 based on the Z depth resolution of the stacked formation 182. Next, the method 600 may move to the step 622. The step 622 may end the method 600.

Figure 14:
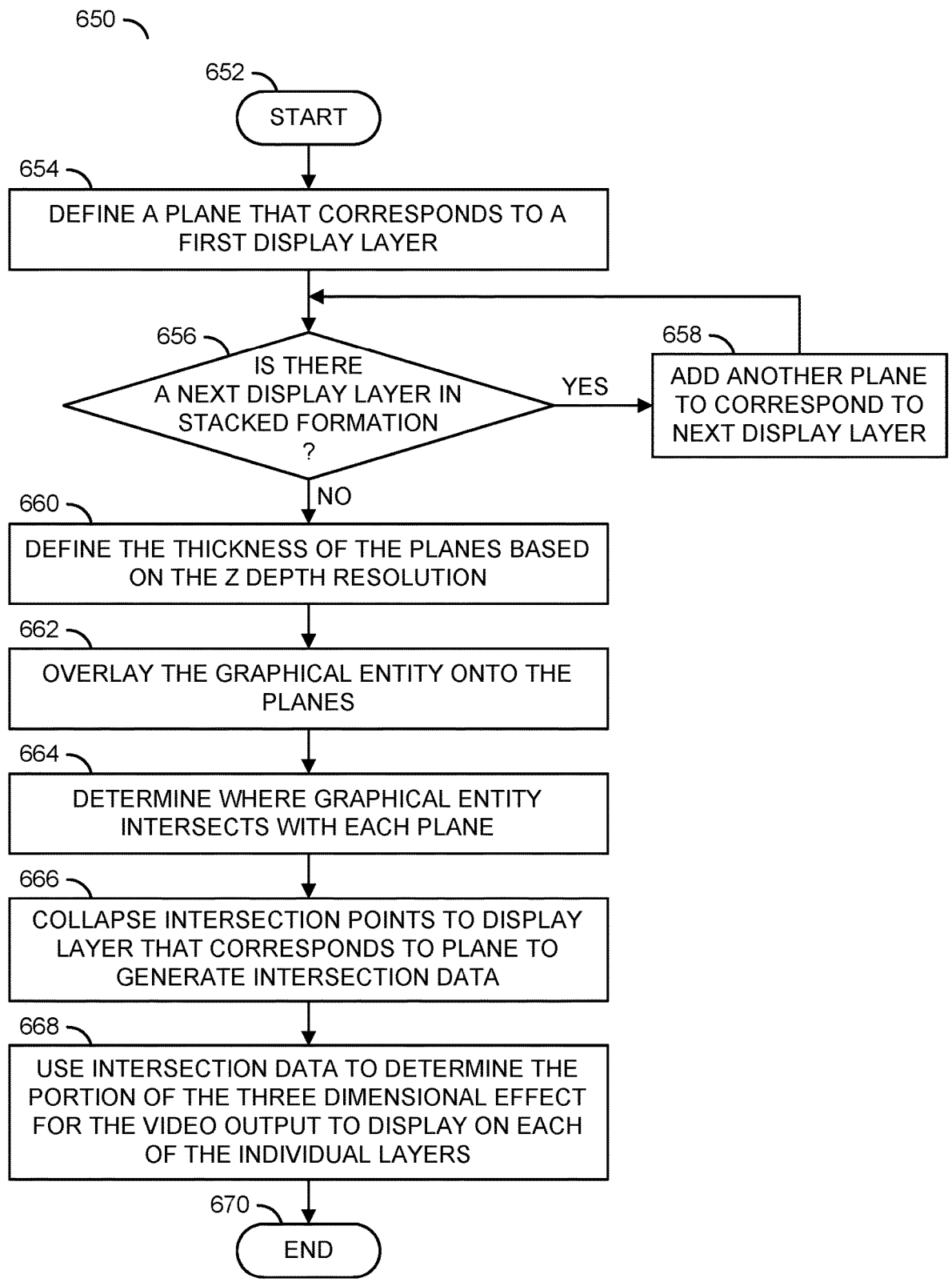
FIG. 14 is a flow diagram illustrating a method for determining a three dimensional effect for a graphical entity in response to intersections with conceptual planes.

Referring to FIG. 14, a method (or process) 650 is shown. The method 650 may determine a three dimensional effect for a graphical entity in response to intersections with conceptual planes. The method 650 generally comprises a step (or state) 652, a step (or state) 654, a decision step (or state) 656, a step (or state) 658, a step (or state) 660, a step (or state) 662, a step (or state) 664, a step (or state) 666, a step (or state) 668, and a step (or state) 670.

The step 652 may start the method 650. In the step 654, the processor 110 may define a plane that corresponds to a first display layer 102a. In an example, the plane may be a conceptual plane used to determine how to create the three dimensional effect for the graphical entity 50. For example, the plane may be defined mathematically. Next, the method 650 may move to the decision step 656.

In the decision step 656, the display manager 106 may determine whether there is a next display layer in the stacked formation 182. In the example shown, the display manager 106 may determine the number of the display layers 102a-102n in the stacked formation 182 sequentially. In some embodiments, the display manager 106 may determine the number of the display layers 102a-102n in parallel and/or substantially in parallel. If there are more display layers, then the method 650 may move to the step 658. In the step 658, the processor 110 may add another of the conceptual planes to correspond to the next one of the display layers 102a-102n. Next, the method 650 may return to the decision step 656. In the decision step 656, if there is no next display layer (e.g., there is one conceptual plane corresponding to each of the display layers 102a-102n), then the method 650 may move to the step 660.

In the step 660, the processor 110 may define a thickness of the planes based on the Z depth resolution. For example, the conceptual planes may be defined with a thickness (e.g., to occupy a volume in three dimensional space instead of a flat plane) based on the number of the display layers 102a-102n available and the height of the graphical entity 50 to enable portions of the graphical entity 50 at particular height ranges of the graphical entity 50 to be collapsed onto one of the display layers 102a-102n. Next, in the step 662, the processor 110 may overlay the graphical entity 50 onto the conceptual planes. Next, the method 650 may move to the step 664.

In the step 664, the processor 110 may determine where (or which portions of) the graphical entity 50 intersects with each of the conceptual planes. Next, in the step 666, the processor 110 may collapse each of the intersection points to the particular one of the display layers 102a-102n that corresponds to the conceptual plane to generate the intersection data. In the step 668, the processor 110 may use the intersection data to determine the portion of the three dimensional effect for the video output to display on each of the individual display layers 102a-102n. Next, the method 650 may move to the step 670. The step 670 may end the method 650.

Figure 15:
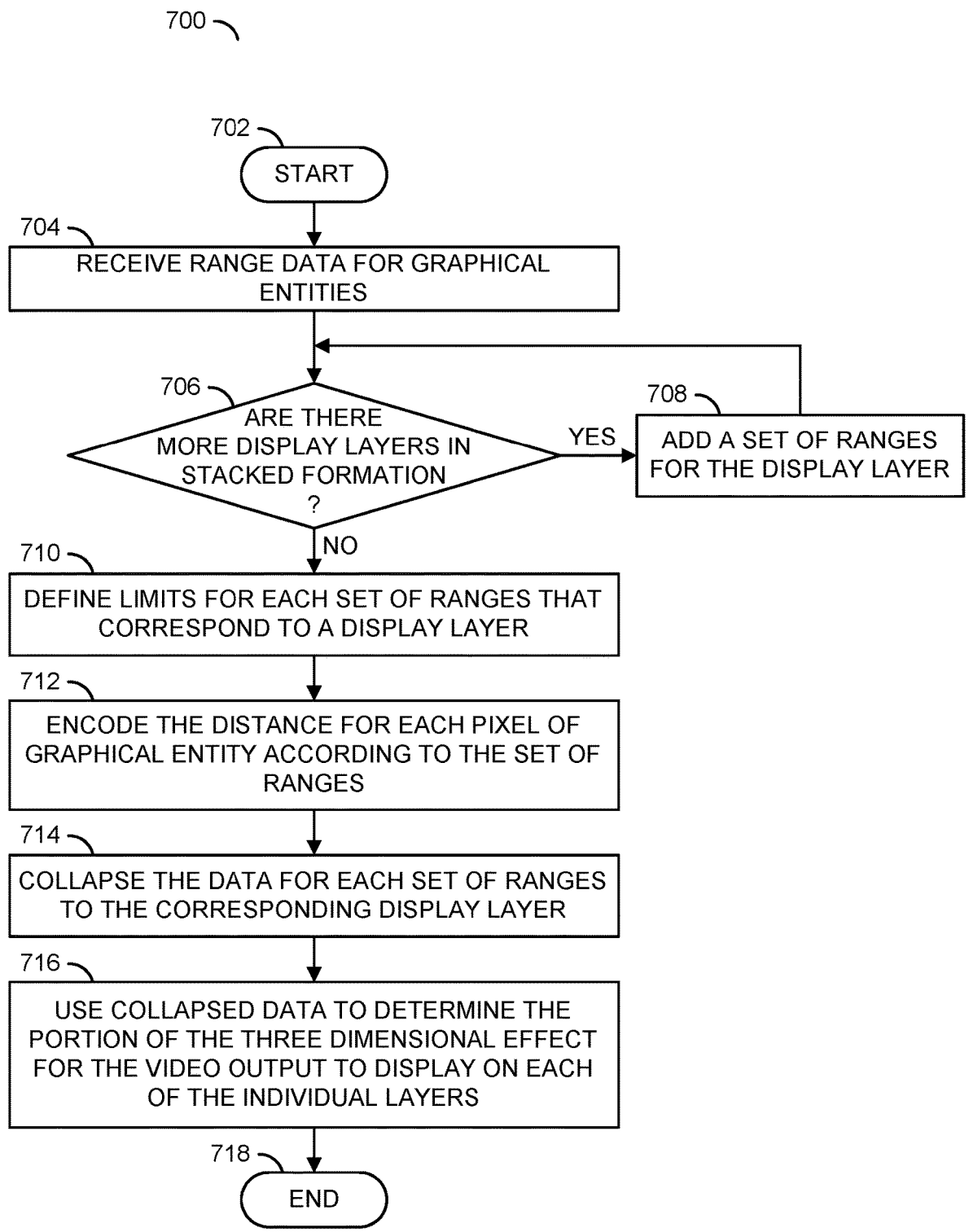
FIG. 15 is a flow diagram illustrating a method for determining a three dimensional effect for a graphical entity in response to encoding range data.

Referring to FIG. 15, a method (or process) 700 is shown. The method 700 may determine a three dimensional effect for a graphical entity in response to encoding range data. The method 700 generally comprises a step (or state) 702, a step (or state) 704, a decision step (or state) 706, a step (or state) 708, a step (or state) 710, a step (or state) 712, a step (or state) 714, a step (or state) 716, and a step (or state) 718.

The step 702 may start the method 700. In the step 704, the processor 110 may receive range data for the graphical entities. In an example, the signal RANGE may provide the range data (e.g., range data generated by an external source). In another example, the processor 110 may generate the range data (e.g., perform disparity calculations based on an analysis of video frames). Next, the method 700 may move to the decision step 706.

In the decision step 706, the display manager 106 may determine whether there are more of the display layers 102a-102n in the stacked formation 182. In the example shown, the display manager 106 may determine the number of the display layers 102a-102n in the stacked formation 182 sequentially. In some embodiments, the display manager 106 may determine the number of the display layers 102a-102n in parallel and/or substantially in parallel. If there are more display layers, then the method 700 may move to the step 708. In the step 708, the processor 110 may add another set of ranges for the display layers 102a-102n. Next, the method 700 may return to the decision step 706. In the decision step 706, if there is no next display layer (e.g., there is one set of ranges corresponding to each of the display layers 102a-102n), then the method 700 may move to the step 710.

In the step 710, the processor 110 may define the limits for each set of ranges. In an example, a range of 0 meters to 5 meters may be the defined limits for the set of ranges that correspond to a top layer 102a, a range of 5 meters to 10 meters may be the defined limits for the set of ranges that correspond to a second layer 102b, etc. Next, in the step 712, the processor 110 may encode the distance of each pixel of the graphical entity 50 according to the set of ranges. For example, the processor 110 may determine the distance that corresponds to the pixel and determine which set of ranges that the pixel belongs to (e.g., a pixel may be encoded to 3 meters, which may correspond to the 0 meter to 5 meter limits of the first set of ranges). In the step 714, the processor 110 may collapse the data assigned to each set of ranges to the corresponding display layers 102a-102n. For example, the pixel encoded to 3 meters that has been assigned to the first set of ranges may be assigned to the top display layer 102a. Next, in the step 716, the processor 110 may use the collapsed data to determine the portion of the three dimensional effect for the video output to the display panels 102a-102n. For example, the data for the pixel encoded to 3 meters may be presented (e.g., via the shared bus 108 and/or the GPU 114a) to the display interface 104a as part of the signal IMG_A. Next, the method 700 may move to the step 718. The step 718 may end the method 700.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a plurality of display panels arranged as individual display layers in a stacked formation, each configured to display video output; and
   a processor configured to (i) determine a three dimensional effect of a graphical entity and (ii) present data for said video output to each of said display panels in response to said three dimensional effect, wherein
   (i) each of said display panels is transparent at locations without said video output,
   (ii) determining said three dimensional effect comprises determining a portion of said three dimensional effect for said video output to display on each of said individual display layers,
   (iii) said video output combined on said stacked formation comprises a real three dimensional representation of said graphical entity,
   (iv) said stacked formation is modified in response to adding to or removing from said stacked formation a number of said display panels, and
   (v) said processor is configured to determine a total number of said display panels in said stacked formation.

2. The apparatus according to claim 1, wherein said plurality of display panels each comprise a transparent OLED display.

3. The apparatus according to claim 1, wherein (i) each of said display panels is opaque at locations with said video output and (ii) said graphical entity comprises at least one of an object and a synthetic symbol.

4. The apparatus according to claim 1, wherein said three dimensional effect determined by said processor comprises determining important data for a top layer of said stacked formation to display in front of data determined to be less important on subsequent layers of said stacked formation.

5. The apparatus according to claim 1, wherein said three dimensional effect determined by said processor comprises determining background information to display on a bottom layer of said stacked formation.

6. The apparatus according to claim 1, wherein a resolution of said real three dimensional representation of said graphical entity on a Z axis is based on a number of said display panels in said stacked formation.

7. The apparatus according to claim 1, wherein (i) each of said plurality of display panels comprises an interface configured to communicate with a shared bus and (ii) said shared bus is configured to transmit data between said processor and each of said display panels.

8. The apparatus according to claim 1, wherein said processor determines said total number of said display panels in said stacked formation in response to (a) sending a ping to a unique address for each of said display panels and (b) determining a presence of each of said display panels at said unique address in response to a reply to said ping by said display panels.

9. The apparatus according to claim 1, wherein (i) said processor determines said total number of said display panels in said stacked formation in response to a presence detection signal generated by each of said display panels and (ii) said presence detection signal is generated by each of said display panels at a periodic time interval.

10. The apparatus according to claim 1, further comprising a graphics processing unit assigned to one or more of each of said plurality of display panels, wherein (i) a number of said display panels is a fixed amount, (ii) said graphics processing unit is configured to (a) provide said video output for a respective one of said display panels and (b) communicate with said processor.

11. The apparatus according to claim 1, wherein said three dimensional effect is determined by said processor in response to (i) defining a number of planes corresponding to each of said display panels in said stacked formation, (ii) overlaying said graphical entity onto said planes, (iii) generating intersection data for where said graphical entity overlaps with each of said planes and (iv) using said intersection data to determine which of said portion of said three dimensional effect for said video output to display on each of said individual display layers.

12. The apparatus according to claim 1, wherein (i) said graphical entity comprises a layered three-dimensional form in response to range data, (ii) said layered three-dimensional form comprises an encoded distance for each pixel of said graphical entity and (iii) said three dimensional effect is determined by said processor in response to selecting a range of distances to display on each of said individual display layers.

13. The apparatus according to claim 1, wherein (i) said apparatus is implemented in a vehicle and (ii) said plurality of display panels are configured to display cockpit information for said vehicle.

14. The apparatus according to claim 13, wherein a top layer of said stacked formation is configured to overlay a high priority warning on top of said cockpit information.

15. The apparatus according to claim 1, wherein (i) said apparatus is implemented to display video data corresponding to a display for a surveillance camera, (ii) a bottom layer of said stacked formation is configured to display background graphical entities detected far away from said surveillance camera and (iii) said individual display layers in front of said bottom layer are configured to display graphical entities detected at pre-defined ranges of distances from said surveillance camera.

16. The apparatus according to claim 1, wherein said three dimensional effect comprises (i) adding a visual effect on a top layer of said stacked formation and (ii) applying a blur effect to said video output on said individual display layers behind said top layer of said stacked formation.

17. The apparatus according to claim 16, wherein (i) said visual effect comprises a wireframe design and (ii) said three dimensional effect further comprises displaying said visual effect on said individual display layers behind said top layer of said stacked formation in a grayscale to create a shadow effect.

18. The apparatus according to claim 1, wherein said three dimensional effect comprises (i) adding a visual effect on a top layer of said stacked formation and (ii) applying a dimming effect to said video output on said individual display layers behind said top layer of said stacked formation.

19. An apparatus comprising:
a plurality of display panels arranged as individual display layers in a stacked formation, each (a) configured to display video output and (b) comprising an interface configured to communicate with a shared bus; and
a processor configured to (i) determine a three dimensional effect of a graphical entity and (ii) present data for said video output to each of said display panels in response to said three dimensional effect, wherein
(i) each of said display panels is transparent at locations without said video output,
(ii) determining said three dimensional effect comprises determining a portion of said three dimensional effect for said video output to display on each of said individual display layers,
(iii) said video output combined on said stacked formation comprises a real three dimensional representation of said graphical entity,
(iv) said shared bus is configured to transmit data between said processor and each of said display panels,
(v) said stacked formation is modified in response to adding to or removing from said stacked formation a number of said display panels, and
(vi) said processor is configured to determine a total number of said display panels in said stacked formation.

* * * * *